United States Patent Office 3,183,235
Patented May 11, 1965

3,183,235
1-[3-, 2-, and 1-INDOLYL-LOWER-ALKANOYL] PIPERIDINES
Bernard L. Zenitz, Colonie, N.Y., assignor to Sterling Drug Inc., New York, N.Y., a corporation of Delaware
No Drawing. Filed June 27, 1961, Ser. No. 119,805
7 Claims. (Cl. 260—294)

This invention relates to intermediates useful in the preparation of 1-[(3-indolyl) - lower - alkyl] - piperidines, 1-[(3-indolyl)-lower-alkyl]-lower-alkylated - piperidines, 1-[(2-indolyl)-lower - alkyl] - piperidines, 1-[(2-indolyl)-lower-alkyl]-lower-alkylated - piperidines, 1-[(1-indolyl)-lower-alkyl]-piperidines, 1-[(1 - indolyl) - lower - alkyl]-lower-alkylated-piperidines, and to processes for the preparation of the latter.

The present invention resides in intermediates useful in preparing compounds wherein there is attached to the 1-, 2-, or 3-position of indole through an unsubstituted lower-alkylene bridge interposing from two to six carbon atoms, a 1-(piperidyl) group or a 1-(lower-alkylated-piperidyl) group further substituted in the piperidine ring by substituents of a nature to be more fully described hereinafter.

The structural embodiments prepared from compounds of the invention are represented by the formulas

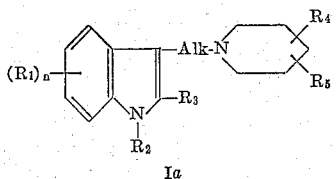

Ia

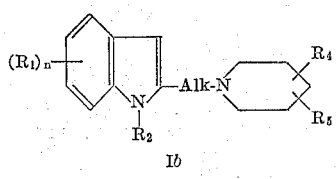

Ib

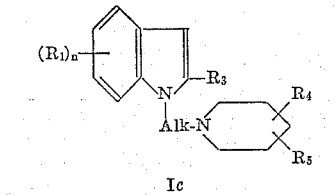

Ic and are thus represented by the composite formula

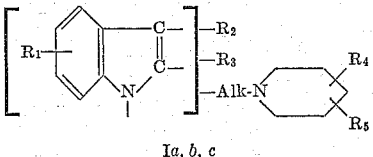

Ia, b, c where any one of the three free valences on the indole ring is taken up by the 1-[lower-alkyl]piperidine group and the valences at the 1- and 2-positions when not taken up by the 1-[lower-alkyl]-piperidine group are taken up by the groups $R_2$ and $R_3$, respectively. In the above general Formulas Ia, b and c, Alk represents lower-alkylene, $R_1$ represents from one to two members of the group consisting of hydrogen, hydroxy, halogen, lower-alkoxy, methylenedioxy, lower-alkylmercapto, lower-alkylsulfonyl, and benzyloxy; $R_2$ represents a member of the group consisting of hydrogen, lower-alkyl, and monocarbocyclic aryl-lower-alkyl; $R_3$ represents a member of the group consisting of hydrogen, lower-alkyl, and monocarbocyclic aryl; $R_4$ represents hydrogen or from one to five lower-alkyl radicals; $R_5$ represents a member of the group consisting of hydroxy, hydroxy-lower-alkyl, lower-alkanoyloxy, monocarbocyclic aroyloxy, lower - alkanoyloxy-lower-alkyl, monocarbocyclic aroyloxy-lower-alkyl, cycloalkyl - lower - alkyl, carbo - lower - alkoxy, unsubstituted-carbamyl, N-lower-alkylcarbamyl, N-lower-alkenylcarbamyl, N,N - di - lower - alkylcarbamyl, N-N-di-lower-alkenylcarbamyl, aminocarbamyl (hydrazido), N-lower-alkylaminocarbamyl (N-lower-alkyl-hydrazido), N-lower-alkylidenehydrazono, aminoethyl, N - lower - alkylaminomethyl, N - lower - alkenylaminomethyl, N,N - di - lower-alkylaminomethyl, N,N - di - lower - alkenylaminomethyl, N-lower-alkylamino, N,N-di-lower alkylamino, and N,N-di-lower-alkenylamino; and $n$ represents the integers 1 or 2.

In the above general Formulas Ia, b, and c, Alk represents lower-alkylene containing from two to seven carbon atoms and interposing from two to six carbon atoms between the indolyl group and the nitrogen atom of the piperidine ring. The lower-alkylene group can be straight or branched and thus represents, inter alia, 1,2-ethylene [—$CH_2CH_2$—], 1,3-propylene [—$CH_2CH_2CH_2$—], 1,2-(1-methylethylene) [—$CH(CH_3)CH_2$—]

1,2-(2-methylethylene)-[—$CH_2CH(CH_3)$—]

1,4, - butylene [—$CH_2CH_2CH_2CH_2$—], 1,3 - (1 - methylpropylene) [—$CH(CH_3)CH_2CH_2$—], 1,2-(1 - ethylethylene) [—$CH(C_2H_5)CH_2$—]

1,5-pentylene [—$CH_2CH_2CH_2CH_2CH_2$—]

1,4-(3-methylbutylene) [$CH_2CH_2CH_2(CH_3)CH_2$—]

1,4-(2,4-dimethylbutylene)
[—$CH(CH_3)CH_2CH(CH_3)CH_2$—]

and the like.

In the above general Formulas Ia, b, and c, $R_1$ represents from one to two members of the group consisting of hydrogen, hydroxy, lower-alkoxy, methylenedioxy, lower-alkylmercapto, lower-alkylsulfonyl, or benzyloxy. When $R_1$ represents two of said groups, the groups may be the same or different and can occupy any of the four available positions on the benzene ring. When $R_1$ represents lower-alkoxy, lower-alkylmercapto, or lower-alkylsulfonyl, the lower-alkyl moiety of said groups can contain from one to about four carbon atoms and can be either straight or branched. $R_1$ thus represents, inter alia, methoxy, ethoxy, 2-propoxy, methylmercapto, ethylmercapto, 2-butylmercapto, methylsulfonyl, ethylsulfonyl, 2-butylsulfonyl, and the like.

In the above general Formulas Ia, b, and c, when $R_2$ or $R_3$ represent lower-alkyl, the lower-alkyl group can contain from one to about four carbon atoms and can be either straight or branched. $R_2$ and $R_3$ each thus represent, inter alia, methyl, ethyl, isopropyl, n-butyl, and the like.

When $R_3$ represents monocarbocyclic aryl or when $R_2$ represent monocarbocyclic aryl-lower-alkyl, the monocarbocyclic aryl moiety thereof represents phenyl or phenyl substituted by one or more substituents such as, for example, halogen (including fluorine, chlorine, bromine, and iodine), lower-alkyl, hydroxy, lower-alkoxy, methylenedioxy, lower - alkylmercapto, lower - alkylsulfinyl, lower-alkylsulfonyl, and the like. When the monocarbocyclic aryl moiety is substituted by more than one of the above substituents, the substituents can be the same or different and can occupy any of the available positions on the phenyl ring. When the substituent is a lower-alkyl, lower-alkoxy, lower-alkylmercapto, lower-alkylsulfinyl, or lower-alkylsulfonyl group, said substituents can be either straight or branched and can contain from one to about four carbon atoms. When $R_2$ represents monocarbocyclic aryl-lower-alkyl, the lower-alkyl part of said group contains from one to two carbon atoms. Thus $R_2$ represents benzyl or phenethyl and $R_2$ represents phenyl, or each of such groups substituted in the phenyl ring by one or more of such substituents, inter alia, as fluoro, chloro, bromo, iodo, methyl, isobutyl, hydroxy, methoxy, n-butoxy, methylenedioxy, methylmercapto, isopropylmercapto, methylsulfinyl, isopropylsulfinyl, methylsulfonyl, isopropylsulfonyl, and the like.

In the general Formulas Ia, b, and c, $R_4$ represents hydrogen or from one to five lower-alkyl radicals. When $R_4$ represents one or more lower-alkyl radicals, each lower-alkyl radical can contain from one to about four carbon atoms, can be straight or branched and can occupy any of the five available positions on the piperidine ring, and when $R_4$ represents more than one lower-alkyl radical, said lower-alkyl radicals can be the same or different and can occupy the same or different positions on the piperidine ring. Thus $R_4$ represents, inter alia, methyl, ethyl, isopropyl, n-butyl, isobutyl, and the like.

When $R_5$ represents hydroxy, lower - alkanoyloxy, monocarbocyclic aroyloxy, N-lower-alkylamino, N,N-di-lower-alkylamino, N,N,-di-lower-alkenylamino, or lower-alkanoylamino, said radicals can occupy either the 3- or 4-positions of the piperidine ring. When $R_5$ represents hydroxy-lower-alkyl, lower - alkanoyloxy - lower - alkyl, monocarbocylic aroyloxy - lower - alkyl, cycloalkyl - lower - alkyl, carbo - lower - alkoxy, substituted - carbamyl, N - lower - alkylcarbamyl, N - lower - alkenylcarbamyl, N,N - di - lower - alkylcarbamyl, N,N - di - lower - alkenylcarbamyl, aminocarbamyl, N - lower - alkylaminocarbamyl, N - lower - alkylidenehydrazono, aminomethyl, N - lower - alkylaminomethyl, N - lower - alkenylaminomethyl, N,N - di - lower - alkylamino - methyl, or N,N - di - lower - alkenylaminomethyl, said radicals can occupy any of the three available positions of the piperidine ring.

When $R_5$ represents hydroxy-lower-alkyl, lower-alkanoyloxy - lower - alkyl, or monocarbocyclic aroyloxy - lower - alkyl, the hydroxy - lower - alkyl or oxy - lower-alkyl moiety can be straight or branched and can contain from one to about six carbon atoms. $R_5$ thus stands, inter alia, for hydroxymethyl, 1 - hydroxy - ethyl, 2 - hydroxyethyl, 3 - hydroxypropyl, 4 - hydroxy - butyl, 5 - hydroxypentyl, 6 - hydroxyhexyl, and the like.

When $R_5$ represents a lower-alkanoyloxy ester of a hydroxy or hydroxy-lower-alkyl radical, or when $R_5$ represents a lower - alkanoylamino radical, the lower-alkanoyl portion of said radicals can be either straight or branched and can contain from one to about six carbon atoms. $R_5$ thus also stands, inter alia, for formyloxy, 2-formyloxy ethyl, acetoxy, 2-acetoxy ethyl, propionoxy, 2-propionoxy ethyl, hexanoyloxy, 2-hexanoyloxy ethyl, α-ethylbutryoxy, 2-(α-ethylbutyroxy)ethyl, formylamino, acetylamino, propionylamino, α-ethylbutyrylamino, and the like.

When $R_5$ represents cycloalkyl-lower-alkyl, the cycloalkyl moiety contains from five to seven ring carbon atoms, and the lower-alkyl moiety contains from one to two carbon atoms. Thus the cycloalkyl-lower-alkyl radical includes such radicals as cyclopentylmethyl, cyclohexylmethyl, 2-(cyclohexyl)ethyl, cycloheptylmethyl, and the like.

When $R_5$ represents a carbo-lower-alkoxy radical, it represents a radical of the formula COOR' where R' is a lower-alkyl group having from one to about six carbon atoms. Thus the carbo-lower-alkoxy radical includes such radicals, inter alia, as carbomethoxy, carboethoxy, carbopropoxy, carboisopropoxy, carbobutoxy, carbohexoxy, and the like.

When $R_5$ represents a monocarbocyclic aroyloxy or a monocarbocyclic aroyloxy-lower-alkyl radical, the monocarbocyclic aroyl moiety can be benzoyl or benzoyl substituted by one or more substituents selected from the group consisting of halogen (including fluorine, chlorine, bromine, and iodine), lower-alkyl, hydroxy, lower-alkoxy, methylenedioxy, lower-alkylmercapto, lower-alkylsulfinyl, lower-alkylsulfonyl, amino, and lower-alkanoylamino. When the monocarbocyclic aroyl moiety is substituted by more than one of the above substituents, the substituents can be the same or different and can occupy any of the available positions on the benzene ring. When the substituent is lower-alkyl, lower-alkoxy, lower-alkylmercapto, lower-alkylsulfinyl, lower-alkylsulfonyl, or lower-alkanoylamino, said substituents can be either straight or branched and can contain from one to about four carbon atoms. Thus $R_5$ also stands, inter alia, for benzoyloxy, 2 - (4 - fluorobenzoyloxy)ethyl, 2 - (2 - chlorobenzoyloxy)ethyl, 3 - (4 - bromobenzoyloxy) - propyl, 6 - (4 - iodobenzoyloxy)hexyl, 3 - methylbenzoyloxy, 3 - (4 - isobutylbenzoyloxy)propyl, 4 - hydroxy-benzoyloxy, 4 - methoxybenzoyloxy, 4 - n - butoxy - benzoyloxy, 3,4 - methylenedioxybenzoyloxy, 4 - methyl - mercaptobenzoyloxy, 4 - isopropylmercaptobenzoyloxy, 4 - methylsulfinylbenzoyloxy, 4 - isopropylsulfinylbenzoyloxy, 4 - methylsulfonylbenzoyloxy, 4 - isopropyl - sulfonylbenzoyloxy, 2 - (4 - aminobenzoyloxy)ethyl, 2 - (4 - acetylaminobenzoyloxy)ethyl, 3 - (3,4 - dimethoxy - benzoyloxy)propyl, 3 - (3 - chloro - 4 - methylbenzoyloxy) - propyl, and the like.

When $R_5$ represents N-lower-alkylcarbamyl, N,N-di-lower-alkylcarbamyl, N - lower - alkylaminocarbamyl, N-lower-alkylaminomethyl, N,N - di-lower-alkylaminomethyl, N-lower-alkylamino, or N,N-di-lower-alkylamino, the alkyl moiety in each of said radicals can contain from one to about four carbon atoms and can be either straight or branched. Thus $R_5$ also represents, inter alia, N-methylcarbamyl, N-ethylcarbamyl, N-butylcarbamyl, N,N-dimethylcarbamyl, N,N-diethylcarbamyl, N,N - dibutylcarbamyl, N - ethylaminocarbamyl, N - isopropylaminocarbamyl, N-methylaminomethyl, N-ethylaminomethyl, N-butylaminomethyl, N,N-dimethylaminomethyl, N,N - diethylaminomethyl, N-methylamino, N-ethylamino, N,N-dimethylamino, N,N-diethylamino, or N,N-dibutylamino.

When $R_5$ represents N-lower-alkenylcarbamyl, N,N-di-lower-alkenylcarbamyl, N - lower-alkylidenehydrazono, N-lower-alkenylaminomethyl, N,N - di - lower - alkenylaminomethyl, or N,N-di-lower-alkenylamino, the lower-alkenyl or lower-alkylidene moiety of said radicals can contain from three to four carbon atoms and can be straight or branched. Thus $R_5$ also stands, inter alia, for N-2-propenylcarbamyl, N - 2-methyl-2-propenylcarbamyl, N,N-di-(2-propenyl)carbamyl, N,N - di - (2-methyl-2-propenyl)carbamyl, 2-propylidenehydrazono, N-2-propenylaminomethyl, N-2-methyl-2-propenylaminomethyl, N,N-di-(2-propenyl)aminomethyl, N,N-di-(3-methyl-2-propenyl)aminomethyl, or N,N-dipropenylamino.

The compounds of Formulas Ia, b, and c where $R_5$ is hydroxy, hydroxy-lower-alkyl, cycloalkyl - lower - alkyl, aminomethyl, N - lower - alkylaminomethyl, N-lower-alkenylaminomethyl, N,N-di-lower-alkylaminomethyl, N, N-di-lower-alkenylaminomethyl, N-lower-alkylamino, N, N-di-lower-alkylamino, or N,N-di - lower - alkenylamino are prepared by reacting with an alkali metal aluminum hydride a respective 1-[(3-indolyl)-lower-alkanoyl]piperidine, 1-[(3-indolyl)-lower-alkanoyl]-lower-alkylated-piperidine, 1 - [(2-indolyl)-lower-alkanoyl]piperidine, 1-[(2-indolyl)-lower-alkanoyl]-lower-alkylated - piperidine, 1-[(1-indolyl)-lower-alkanoyl]piperidine, or 1-[(1-indolyl)-lower-alkanoyl]-lower - alkylated - piperidine, which latter have the formulas

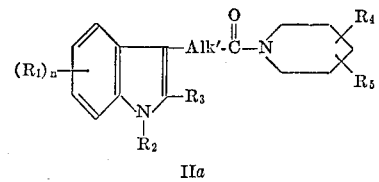

IIa

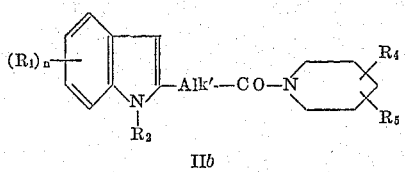
IIb

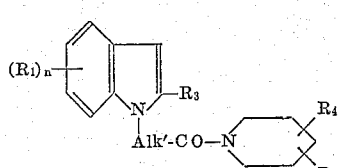
IIc and which are thus represented by the composite formula

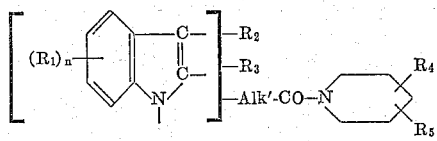

where any one of the three free valences on the indole ring is taken up by the 1-[lower-alkanoyl]piperidine group and the valences at the 1- and 2-positions, when not taken up by the 1-[lower-alkanoyl]piperidine group, are taken up by the groups $R_2$ and $R_3$, respectively, and where $R_1$, $R_2$, $R_3$, $R_4$, and $n$ have the meanings given above, Alk' is lower-alkylene containing from one to six carbon atoms and interposing from one to five carbon atoms between the indolyl group and the carbonyl carbon atom of the lower-alkanoyl group, and $R_5$ is hydroxy, lower-alkanoyloxy, monocarbocyclic aroyloxy, hydroxy-lower-alkyl, lower-alkanoyloxy - lower - alkyl, monocarbocyclic aroyloxy-lower-alkyl, cycloalkyl - lower - alkyl, carbo-lower-alkoxy, unsubstituted-carbamyl, N-lower-alkylcarbamyl, N-lower-alkenylcarbamyl, N,N-di-lower-alkylcarbamyl, N,N-di-lower-alkenylcarbamyl, N,N - di - lower-alkylaminomethyl, N,N - di - lower - alkenylaminomethyl, lower-alkanoylamino, N,N-di-lower-alkylamino, or N,N-di-lower-alkenylamino. The reaction is carried out at a temperature in the range of from about 0° C. to about 65° C. in an organic solvent inert under the conditions of the reaction. It is preferred to use lithium aluminum hydride.

The intermediate 3-, 2-, and 1-indolyl-lower-alkanoyl-amides of Formulas IIa, b, and c above of the instant invention are prepared by reacting a 3-, 2-, or 1-indolyl-lower-alkanoic acid with a lower-alkyl haloformate in the presence of an acid-acceptor, for example triethylamine, at a temperature between about −20° C. and 20° C. to give a mixed anhydride of a lower-alkyl carbonic acid and the 3-, 2-, or 1-indolyl-lower-alkanoic acid. The latter have the Formulas VIIa, b, and c.

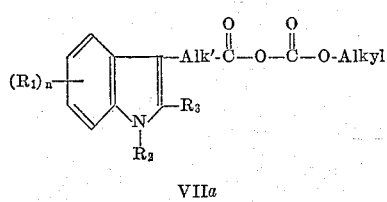
VIIa

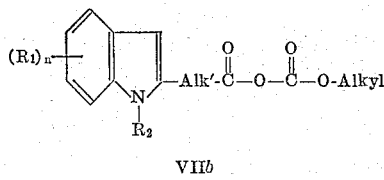
VIIb

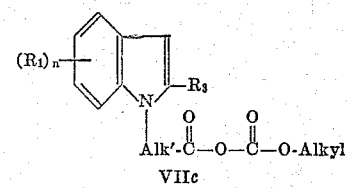
VIIc and are thus represented by the composite formula

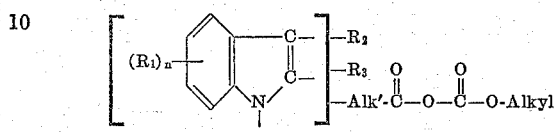

where any one of the three free valences on the indole ring is taken up by the Alk'—COO—COO—Alkyl group and the valences at the 1- and 2-position, when not taken up by the Alk'—COO—COO—Alkyl group, are taken up by the groups $R_2$ and $R_3$, respectively, and where $R_1$, $R_2$, $R_3$, $R_4$, Alk', and $n$ have the meanings given above and Alkyl represents lower-alkyl containing from one to about five carbon atoms. The reaction is preferably carried out in an organic solvent inert under the conditions of the reaction such as anhydrous acetone, ether, ethylene dichloride, and like. Acetone is the preferred solvent. The purpose of the acid-acceptor is to take up the hydrogen halide split out during the course of the reaction and is a basic substance which forms water-soluble by-products easily separable from the product.

The indolyl-lower-alkane mixed anhydrides of the (1-, 2- and 3-indolyl)-lower-alkanoic acids of Formulas VIIa, b, and c thus formed in situ are reacted with an appropriate piperidine or lower-alkylated-piperidine at a temperature between about −20° C. and about 20° C. to give the 1-[(3-indolyl)-lower-alkanoyl]piperidine, 1-[(3-indolyl)-lower - alkanoyl] - lower - alkylated - piperidine, 1 - [(2-indolyl)-lower-alkanoyl] piperidine, 1-[(2-indolyl)-lower-alkanoyl]-lower-alkylated-piperidine, 1-[1-indolyl)-lower-alkanoyl]piperidine or 1-[(1-indolyl)-lower-alkanoyl]-lower-alkylated-piperidine of Formulas IIa, b, and c.

The compounds of Formula Ia where Alk is the 1,2-ethylene group (—CH$_2$CH$_2$), $R_2$ is hydrogen, and $R_5$ is hydroxy, hydroxy-lower-alkyl, cycloalkyl - lower - alkyl, aminomethyl, N - lower - alkylaminomethyl, N - lower-alkenylaminomethyl, N,N - di - lower-alkylaminomethyl, N,N - di - lower - alkenyl - aminomethyl, N-lower - alkylamino, N,N - di - lower- alkylamino, or N,N-di-lower-alkenylamino are prepared by reacting with an alkali metal aluminum hydride a respective 1-[(3-indolyl) glyoxalyl]piperidine or 1-[(3-indolyl)- glyoxalyl]-lower-alkylated-piperidine which is also within the purview of the instant invention and which has the formula

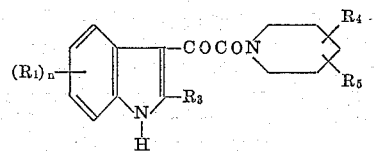
IIIa where $R_1$, $R_3$, $R_4$, and $n$ have the meanings given above and $R_5$ is hydroxy, lower-alkanoyloxy, monocarbocyclic aroyloxy, hydroxy-lower-alkyl, lower-alkanoyloxy-lower-alkyl, monocarbocyclic aroyloxy-lower-alkyl, cycloalkyl-lower-alkyl, carbo-lower-alkoxy, unsubstituted-carbamyl, N-lower-alkylcarbamyl, N-lower-alkenyl-carbamyl, N,N-di-lower-alkylcarbamyl, N,N-di - lower - alkenylcarbamyl, N,N-di-lower-alkylaminomethyl, N,N-di - lower - alkenyl-aminomethyl, N,N-di-lower-alkylamino, or N,N-di-lower-alkenylamino. The reaction is carried out at a temperature in the range from about 0° C. to about 65° C. in an organic solvent inert under the conditions of the reaction. It is preferred to used lithium aluminum hydride.

The intermediate glyoxamides of formula IIIa are prepared by reacting an indole with a glyoxalyl halide at a temperature in the range from about −20° C. to 25° C. in an organic solvent inert under the conditions of the reaction, such as ether, petroleum ether, dioxane, tetrahydrofuran, and the like thus affording the 3-indolylglyoxalyl halides of Formula IVa. The latter are then reacted with a piperidine or lower-alkylated-piperidine of formula V at a temperature in the range from about −5° C. to about 65° C. in the presence of an acid-acceptor to give the 1-[(3-indolyl)-glyoxalyl]piperidines or 1-[(3-indolyl)glyoxalyl]-lower-alkylated-piperidines of Formula IIIa. The reaction is represented by the equation:

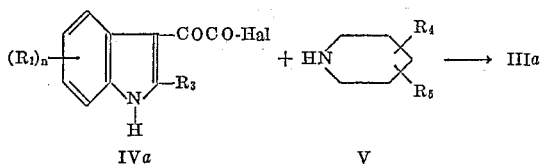

where $R_1$, $R_3$, $R_4$, $R_5$, and $n$ have the meanings given above, and Hal represents halogen. The reaction is preferably carried out in an organic solvent inert under the conditions of the reaction, for example tetrahydrofuran, ether, ethylene dichloride, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the piperidine or lower-alkylated-piperidine. A preferred solvent is tetrahydrofuran, and it is preferred to use an excess quantity of the piperidine or lower-alkylated-piperidine as the acid-acceptor.

When $R_5$ in the compounds of Formulas IIa, b, and c and IIIa is a non-reducible group, for example hydroxy, hydroxy-lower-alkyl, cycloalkyl-lower-alkyl, N,N-di-lower-alkylamino or N,N-di-lower-alkenylamino, the respective compounds of Formula Ia, b, or c are produced in which the group $R_5$ remains unchanged in the reaction. But when $R_5$ in the compounds of Formulas IIa, b, and c, or Formula IIIa is a reducible group, the group $R_5$ is reduced simultaneously with the alkanoyl carbonyl group or the glyoxalyl group thus producing products of Formulas Ia, b, and c in which the piperidyl group is substituted by the group $R_5$ in a reduced state. In such cases an additional amount of the alkali metal aluminum hydride must be used in the reaction mixture to insure the complete reduction of both the $R_5$ substituent and the carbonyl groups of the lower-alkanoyl or glyoxalyl radicals. Thus a one molar equivalent of an alkali metal aluminum hydride, in addition to the one molar equivalent required to reduce the lower-alkanoyl carbonyl group or the two molar equivalents required to reduce the glyoxalyl group, would reduce a lower-alkanoyloxy group or a monocarbocyclic aroyloxy group to the hydroxy group, a lower-alkanoyloxy-lower-alkyl or a monocarbocyclic aroyloxy-lower-alkyl group to a hydroxy-lower-alkyl group, a carbo-lower-alkoxy group to the hydroxymethyl i.e., a hydroxy-lower-alkyl group, the unsubstituted-carbamyl group to the aminomethyl group, an N-lower-alkylcarbamyl group to an N-lower-alkylaminomethyl group, an N-lower-alkenylcarbamyl group to an N-lower-alkenylaminomethyl group, an N,N-di-lower-alkylcarbamyl group to an N,N-di-lower-alkylaminomethyl group, an N,N-di-lower-alkenylcarbamyl group to an N,N-di-lower-alkenylaminomethyl group, or a lower-alkanoylamino group to an N-lower-alkylamino group.

The compounds of Formulas Ia, b, and c where $R_5$ is hydroxy, lower-alkanoyloxy, monocarbocyclic aroyloxy, hydroxy-lower-alkyl, lower-alkanoyloxy-lower-alkyl, monocarbocyclic aroyloxy-lower-alkyl, cycloalkyl-lower-alkyl, carbo-lower-alkoxy, unsubstituted-carbamyl, N-lower-alkylcarbamyl, N-lower-alkenylcarbamyl, N,N-di-lower-alkylcarbamyl, N,N-di-lower-alkenylcarbamyl, N-lower-alkylidenehydrazono, or lower-alkanoylamino are prepared by reacting a (1-, 2- or 3-indolyl)-lower-alkyl halide (Formulas VIa, b, c below) with the appropriately substituted piperidine or lower-alkylated-piperidine (Formula V) at a temperature between about 50° and 150° C. in the presence of an acid-acceptor. The reaction is represented by the following equation:

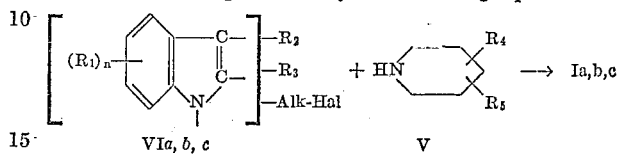

where $R_1$, $R_2$, $R_3$, $R_4$, $R_5$, $n$, and Alk have the meaning given above and Hal is halogen.

The reaction is preferably carried out in an organic solvent, inert under the conditions of the reaction, for example anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g., sodium carbonate, sodium bicarbonate, potassium carbonate, sodium acetate, sodium alkoxides, and the like. The acid-acceptor can also be in the form of an excess quantity of the piperidine or lower-alkylated-piperidine.

The compounds of Formula Ia where $R_2$ is a hydrogen atom and $R_5$ is hydroxy, hydroxy-lower-alkyl, lower-alkanoyloxy, monocarbocyclic aroyloxy, lower-alkanoyloxy-lower-alkyl, monocarbocyclic arolyloxy-lower-alkyl, cycloalkyl-lower-alkyl, unsubstituted-carbamyl, N-lower-alkylcarbamyl, N-lower-alkenylcarbamyl, N,N-di-lower-alkylcarbamyl, N,N-di-lower-alkenylcarbamyl, N,N-di-lower-alkylaminomethyl, N,N-di-lower-alkenylaminomethyl, N,N-di-lower-alkylamino, or N,N-di-lower-alkenylamino are also prepared by reacting phenylhydrazine or an appropriately substituted-phenylhydrazine with a 1-(ω-formyl-lower-alkyl)-substituted-piperidine, a 1-(ω-lower-alkanoyl-lower-alkyl)-substituted-piperidine, or a 1-(ω-monocarbocyclic aroyl-lower-alkyl)-substituted-piperidine. The reaction is represented by the following equations:

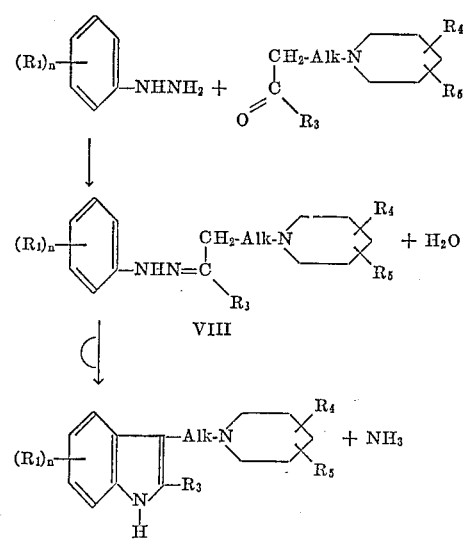

The reaction, known as the Fischer indole reaction, takes place in two steps with the formation of the hydrazone of Formula VIII occurring in the first step. The hydrazone then rearranges, under the conditions of the reaction, with loss of a molecule of ammonia to form the compounds of Formula Ia.

The reaction is carried out at a temperature in the range from about 20° C. to about 150° C. in an organic solvent inert under the conditions of the reaction, for example, ethanol, methanol, isopropanol, glacial acetic acid, and the like and in the presence of an acid catalyst, for example, sulfuric acid, hydrochloric acid, glacial acetic acid, zinc chloride, cuprous chloride, or boron trifluoride.

The compounds of Formulas I$a$, $b$, and $c$; II$a$, $b$, and $c$; and III$a$ where $R_5$ is aminocarbamyl (hydrazido) are prepared by reacting the respective compounds of Formulas I$a$, $b$, and $c$; II$a$, $b$, and $c$; and III$a$ where $R_5$ is carbo-lower-alkoxy with a molar excess of hydrazine hydrate at a temperature in the range from about 80° C. to about 120° C. Although it is preferred to use 100% hydrazine hydrate, aqueous solutions of hydrazine hydrate can also be used successfully, for example, commercially available 80% solutions.

The compounds of Formulas I$a$, $b$, and $c$; II$a$, $b$, and $c$; and III$a$ where $R_5$ is n-lower-alkylidene hydrazono are prepared by reacting the respective compounds of Formulas I$a$, $b$, and $c$; II$a$, $b$, and $c$; and III$a$ where $R_5$ is aminocarbamyl (hydrazido) with a lower-aliphatic aldehyde or di-lower-alkyl ketone at a temperature in the range from about 50° C. to about 150° C.

The compounds of Formulas I$a$, $b$, and $c$; II$a$, $b$, and $c$; and III$a$ where $R_5$ is N-loweralkylaminocarbamyl are prepared by reducing with hydrogen over a catalyst the respective compounds of Formulas I$a$, $b$, and $c$; II$a$, $b$, and $c$; and III$a$ where $R_5$ is N-lower-alkylidene hydrazono. The reaction is carried out in an organic solvent inert under the conditions of the reaction, for example methanol, ethanol, isopropanol, and the like, at a temperature in the range from about 25° C. to about 75° C. and at hydrogen pressures in the range from about 50–70 pounds p.s.i. A preferred catalyst is platinum oxide.

The intermediate indolyl-lower-alkyl halides of Formulas VI$a$, $b$, and $c$ used as intermediates in the method described above are prepared by reduction of a 1-, 2-, or 3-indolyl-lower-alkanoic acid with lithium aluminum hydride and conversion of the resulting alcohol to the corresponding halide by reacting the former with, for example, a phosphorous trihalide or a thionyl halide.

The compounds of Formulas I$a$, $b$, and $c$ where $R_5$ is the 4-hydroxy group can also be prepared by any of the above general procedures by reacting 4-piperidone or a lower-alkylated-4-piperidone with a lower-alkane mixed anhydride of a 3-, 2-, or 1-indolyl-lower-alkanoic acid to give a 1-[(3-, 2-, or 1-indolyl)-lower-alkanoyl]-4-piperidone or lower-alkylated-4-piperidone; by reacting 4-piperidone or a lower-alkylated-4-piperidone in the presence of an acid-acceptor with a (3-, 2-, or -indolyl)-lower-alkyl halide to give a 1-[(3-, 2-, or 1-indolyl)-lower-alkyl]-4-piperidone or lower-alkylated-4-piperidone; by reacting a 4-piperidone or lower-alkylated-4-piperidone in the presence of an acid-acceptor with a 3-indolylglyoxalyl halide to give a 1-[(3-indolyl)-glyoxallyl]-4-piperdone or lower-alkylated-4-piperidone; or by reacting phenylhydrazine or a substituted-phenylhydrazine with a 1-($\omega$-formyl-lower-alkyl)-4-piperidone, a 1-($\omega$-lower-alkanoyl-lower-alkyl)-4-piperidone, or a 1-($\omega$-monocarbocyclic aroyl-lower-alkyl)-4-piperidone and reacting the product in each case with an alkali metal aluminum hydride to reduce the 4-carbonyl group of the 4-piperidone or lower-alkylated-4-piperidone ring to the 4-hydroxy group.

Pharmacological evaluation of the compounds of Formulas I$a$, $b$, and $c$ have shown that they possess pharmacodynamic and chemotherapeutic properties, in particular, hypotensive, sedative, anti-inflammatory, monoamine oxidase inhibitory, coronary dilator, adrenolytic, tranquilizing, and antibacterial activities thus indicating their usefulness as blood pressure lowering agents, sedatives, anti-inflammatory agents, psychic energizers, coronary dilators, tranquilizers, and anti-bacterial agents. The compounds of Formulas II$a$, $b$, and $c$ have also been shown to possess hypotensive and coronary dilator activities and are thus useful not only as intermediates in the preparation of the compounds of Formulas I$a$, $b$, and $c$ but also have utility as blood pressure lowering agents and coronary dilators.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

*3-[2-(4-hydroxy-1-piperidyl)ethyl]indole*

[I$a$; $R_1$, $R_2$, $R_3$ and $R_4$ are H, $R_5$ is 4-OH, Alk is $CH_2CH_2$]

bromide and 4.5 g. (0.04 mole) of 4-hydroxypiperidine in 200 ml. of acetonitrile was heated under reflux for about twenty hours. The cooled solution was decanted from a viscous yellow oil which had separated, and the oil washed with two 50 ml. portions of acetonitrile. The combined acetonitrile solutions were concentrated in vacuo giving a viscous yellow oil which was dissolved in 110 ml. of 10% aqueous acetic acid. The acid solution was filtered, basified with concentrated ammonium hydroxide, and the solid which separated collected and dried giving 4.55 g. of crude product. The latter, on recrystallization from ethyl acetate, afforded 2.37 g. of 3-[2-(4-hydroxy-1-piperidyl)ethyl]indole, M.P. 144.6–146.8° C. (corr.).

3-[2-(4-hydroxy-1-piperidyl)ethyl]indole reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3 - indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, bromide, benzyl chloride, 2-chlorobenzyl chloride, 2,3,4,5,6-pentachlorobenzyl chloride, or methyl p-toluenesulfonate to give the methiodide, methobromide, ethobromide, allobromide, benzochloride, 2-chlorobenzochloride, 2,3,4,5,6-pentachlorobenzochloride, or metho-p-toluenesulfonate salts, respectively.

The compounds of Formulas Ia and Ic listed in Table 1 below were prepared according to the procedure described above in Example 1 from an appropriate (3- or 1-indolyl)-loweralkyl halide and an appropriate substituted-piperidine. All melting points are corrected unless noted otherwise. The compounds of Formula Ic are indicated by an asterisk (*).

TABLE 1

| Example | $R_1/R_2$ | $R_3/R_4$ | $R_5$/Alk | Base or salt | M.P./cryst. from— |
|---|---|---|---|---|---|
| 2 | H / H | H / 2,6-di-CH$_3$ | 4-OH / CH$_2$CH$_2$ | Base | 230.0–235.4° C. isopropanol. |
| 3 | H / H | H / H | 4-CH$_2$OH / CH$_2$CH$_2$ | do | 160.6–163.2° C. ethyl acetate. |
| 4 | H / H | H / H | 2-CH$_2$OH / CH$_2$CH$_2$ | do | 101.4–102.2° C. ethyl acetate/hexane. |
| 5 | H / H | H / H | 4-CH$_2$CH$_2$OH / CH$_2$CH$_2$ | do | 116.0–118.8° C. ethyl acetate. |
| 6 | H / H | H / H | 4-CHOHCH$_3$ / CH$_2$CH$_2$ | HCl | 176.8–184.3° C. methanol. |
| 7 | H / H | H / H | 4-(CH$_2$)$_3$OH / CH$_2$CH$_2$ | Base | 109.4–114.2° C. ethyl acetate. |
| 8 | H / H | H / H | 4-(CH$_2$)$_4$OH / CH$_2$CH$_2$ | do | 140.6–143.4° C. acetonitrile. |
| 9 | H / H | H / H | 4-(CH$_2$)$_5$OH / CH$_2$CH$_2$ | do | 143.0–144.2° C. acetonitrile. |
| 10 | H / H | H / H | 4-(CH$_2$)$_6$OH / CH$_2$CH$_2$ | do | 112.4–115.8° C. ethyl acetate. |
| 11 | H / H | H / H | 4-CH$_2$CH$_2$OH / (CH$_2$)$_3$ | do | 129.2–130.4° C. ethyl acetate/hexane. |
| 12 | H / H | H / H | 4-CHOHCH$_3$ / (CH$_2$)$_3$ | do | 139.8–140.8° C. ethyl acetate/hexane. |
| *13 | H / H | H / H | 4-(CH$_2$)$_3$OH / (CH$_2$)$_3$ | HCl | 180.4–181.8° C. isopropanol. |
| 14 | H / H | H / H | 4-COOCH$_3$ / CH$_2$CH$_2$ | Base | 110.4–111.8° C. acetone/hexane. |
| 15 | H / H | H / H | 3-COOCH$_3$ / CH$_2$CH$_2$ | do | 107.8–110.4° C. benzene/hexane. |
| 16 | H / H | H / H | 2-COOC$_2$H$_5$ / CH$_2$CH$_2$ | do | 125.2–126.8° C. acetone/hexane. |
| *17 | H / H | H / H | 4-COOCH$_3$ / (CH$_2$)$_3$ | HCl | 130.6–132.4° C. methanol. |
| *18 | H / H | H / H | 3-COOCH$_3$ / (CH$_2$)$_3$ | HCl | 116.2–118.0° C. ethanol/ether. |
| 19 | H / H | H / H | 4-CONH$_2$ / CH$_2$CH$_2$ | Base | 182.6–184.0° C. ethyl acetate. |
| 20 | H / H | H / H | 4-NHCOCH$_3$ / CH$_2$CH$_2$ | do | 166.8–169.2° C. ethyl acetate. |
| 21 | H / H | H / H | 4-CONHC$_2$H$_5$ / CH$_2$CH$_2$ | do | 166.4–168.6° C. ethyl acetate. |
| 22 | H / H | H / H | 4-CON(C$_2$H$_5$)$_2$ / CH$_2$CH$_2$ | do | 139.2–140.4° C. ethyl acetate. |
| 23 | H / H | H / H | 4-CONHCH$_3$ / (CH$_2$)$_3$ | do | 139.8–140.6° C. ethyl acetate/hexane. |
| 24 | H / H | H / H | 4-CONHC$_2$H$_5$ / (CH$_2$)$_3$ | do | 147.0–148.2° C. ethyl acetate/hexane. |
| *25 | H / H | H / H | 4-CONH$_2$ / (CH$_2$)$_3$ | do | 126.8–127.8° C. ethyl acetate. |
| *26 | H / H | H / H | 4-CONHCH$_3$ / (CH$_2$)$_3$ | do | 104.2–106.0° C. isopropanol. |
| *27 | H / H | H / H | 4-CONHC$_2$H$_5$ / (CH$_2$)$_3$ | do | 106.2–106.8° C. hexane. |
| *28 | H / H | H / H | 2-CONHC$_2$H$_5$ / (CH$_2$)$_3$ | do | 71.2–73.0° C. ethyl acetate/hexane. |
| 29 | H / H | H / H | 4-CH$_2$C$_6$H$_{11}$ / CH$_2$CH$_2$ | do | 143.0–143.8° C. hexane. |

*Compound of Formula Ic.

phosphotungstate, molybdate, phosphomolybdate, pyrophosphate, arsenate, picrate, picrolonate, barbiturate and boron trifluoride salts.

3-[2-(4-hydroxy-1-piperidyl)ethyl]indole can be reacted with hydriodic acid to form 3-[2-(4-hydroxy-1-piperidyl)-ethyl]indole hydriodide, useful as a characterizing intermediate.

3-[2-(4-hydroxy-1-piperidyl)ethyl]indole, in the form of its hydriodide salt, can be converted to the hydrochloride salt by passing an aqueous solution of the former over an ion-exchange resin saturated with chloride ions, for example Rohm & Haas' Amberlite® IRA–400 resin.

3-[2-(4-hydroxy-1-piperidyl)ethyl]indole can be reacted with methyl iodide, methyl bromide, ethyl bromide, allyl

EXAMPLE 30

*3-[2-(4-aminocarbamyl-1-piperidyl)ethyl]indole*

[Ia; $R_1$, $R_2$, $R_3$ and $R_4$ are H, $R_5$ is 4-CONHNH$_2$, Alk is CH$_2$CH$_2$]

A solution of 3.0 g. (0.01 mole) of 3-[2-(4-carbomethoxy-1-piperidyl)ethyl]indole, in 16 ml. of hydrazine hydrate was heated under reflux for six hours. The reaction mixture was then evaporated to dryness in vacuo, and the gummy white crystalline residue was extracted with five 50 ml. portions of boiling chloroform. The chloroform extracts were filtered, concentrated to about 100 ml. and diluted with 400 ml. of hexane. The solid which separated was collected, washed with cold hexane and recrystallized repeatedly from a chloroform-hexane mixture giving 3.88 g. of 3-[2-(4-aminocarbamyl-1-piperidyl)ethyl]indole, M.P. 164.6–166.0° C. (corr.).

EXAMPLE 31

*3-[2-(4-isopropylidenehydrazono-1-piperidyl)ethyl]indole*

[Ia; $R_1$, $R_2$, $R_3$ and $R_4$ are H, $R_5$ is 4-CONHN=C($CH_3$)$_2$, Alk is $CH_2CH_2$]

A solution of 4.0 g. (0.014 mole) of 3-[2-(4-aminocarbamyl-1-piperidyl)ethyl]indole in 60 ml. of acetone was heated under reflux for seven hours. The solid that separated from the cooled reaction mixture was collected and recrystallized from ethyl acetate giving 3.27 g. of 3-[2-(4-isopropylidenehydrazono - 1 - piperidyl)ethyl]indole, M.P. 184.0–186.8° C. (corr.).

EXAMPLE 32

*3-[2-(4-isopropylaminocarbamyl-1-piperidyl)ethyl]indole*

[Ia; $R_1$, $R_2$, $R_3$ and $R_4$ are H, $R_5$ is 4-CONHNHCH($CH_3$)$_2$, Alk is $CH_2CH_2$]

About 0.02 mole of 3-[2-(4-isopropylidenehydrazono-1-piperidyl)ethyl]indole, dissolved in 200 ml. of methanol, was reduced over 0.2 g. of platinum oxide under a hydrogen pressure of about 55 pounds p.s.i. Reduction was complete in about four hours. The catalyst was removed by filtration. The filtrate was taken to dryness and the resulting solid recrystallized from a chloroform-hexane mixture giving 2.05 g. of 3-[2-(4-isopropylaminocarbamyl-1-piperidyl)ethyl]indole, M.P. 151.4–153.8° C. (corr.).

EXAMPLE 33

*3 - [2 - (2 - aminocarbamyl - 1 - piperidyl)ethyl] indole* [Ia; $R_1$, $R_2$, $R_3$ and $R_4$ are H, $R_5$ is 2-CONHNH$_2$, Alk is $CH_2CH_2$] was prepared from 2.63 g. (0.009 mole) of 3-[2-(2-carbethoxy-1-piperidyl)ethyl]indole and 6 ml. of 100% hydrazine hydrate in 50 ml. of isopropyl alcohol according to the manipulative procedure described above in Example 30. The product was recrystallized from a chloroform-hexane mixture giving 1.0 g. of 3 - [2-(2 - aminocarbamyl-1-piperidyl)ethyl]indole, M.P. 138.4–139.8° C. (corr.).

EXAMPLE 34

*1-[3-(3-hydroxymethyl-1-piperidyl)propyl] indole hydrochloride*

[Ic; $R_1$, $R_3$ and $R_4$ are H, $R_5$ is 3-$CH_2OH$, Alk is ($CH_2$)$_3$]

About 15 g. (0.05 mole) of 1-[3-(3-carbomethoxy-1-piperidyl)propyl]indole prepared above in Example 18 was dissolved in 250 ml. of dry tetrahydrofuran in a three-necked round bottom flask equipped with a dropping funnel, reflux condenser and mechanical stirrer. To the solution was added with stirring and cooling, a solution containing 2.85 g. (0.08 mole) of lithium aluminum hydride in 250 ml. of anhydrous tetrahydrofuran. When all of the lithium aluminum hydride solution had been added, the mixture was refluxed with stirring for about six hours, and allowed to cool. The excess lithium aluminum hydride was decomposed by dropwise addition of a solution of 6 ml. of water in 15 ml. of tetrahydrofuran. The mixture was filtered, the filter cake washed with three 100 ml. portions of tetrahydrofuran, and the combined filtrates were evaporated in vacuo giving a viscous oil. The latter was taken into ether and treated with a solution of anhydrous hydrogen chloride in ether. The precipitated gummy solid was separated from the supernatant liquid by decantation and recrystallized from an isopropanol-ether mixture giving 7.67 g. of 1-[3-(3-hydroxymethyl - 1-piperidyl)propyl]indole hydrochloride, M.P. 127.5–133.3° C. (corr.).

EXAMPLE 35

*3-[2-(4-ethylamino-1-piperidyl)ethyl]indole dihydrochloride*

[Ia; $R_1$, $R_2$, $R_3$ and $R_4$ are H, $R_5$ is 4-NHC$_2$H$_5$, Alk is $CH_2CH_2$]

3-[2-(4-acetylamino-1-piperidyl)ethyl]indole (7.3 g., 0.03 mole) prepared above in Example 20, in 300 ml. of anhydrous tetrahydrofuran, was reduced with 3.89 g. (0.10 mole) of lithium aluminum hydride in 150 ml. of dry tetrahydrofuran according to the manipulative procedure described above in Example 34. The product was isolated as the free base and converted to the dihydrochloride salt. The latter was recrystallized from an ethanol-ether mixture giving 2.3 g. of 3-[2-(4-ethylamino-1-piperidyl)ethyl]indole dihydrochloride, M.P. 259.6–262° C. (dec.)(corr.).

EXAMPLE 36

3-{2-[4-(N - ethylaminomethyl) - 1 - piperidyl]ethyl} indole dihydrochloride [Ia; $R_1$, $R_2$, $R_3$ and $R_4$ are H, $R_5$ is 4-CH$_2$NHC$_2$H$_5$, Alk is $CH_2CH_2$] was prepared from 5.50 g. (0.02 mole) of 3-{2-[4-(N-ethylcarbamyl)-1-piperidyl] ethyl}indole, prepared above in Example 21, by reduction of the latter in 280 ml. of dry tetrahydrofuran with 1.40 g. (0.04 mole) of lithium aluminum hydride in 200 ml. of anhydrous tetrahydrofuran according to the manipulative procedure described above in Example 34. The product was isolated in the form of the free base and converted to the dihydrochloride salt. The latter was recrystallized from a methanol-ether mixture giving 3.18 g. of 3-{2-[4-(N-ethylaminomethyl)-1-piperidyl]ethyl} indole dihydrochloride, does not melt up to 290° C.

EXAMPLES 37–40

By following the manipulative procedure described above in Example 1, substituting for the 2-(3-indolyl) ethyl bromide and the 4-hydroxypiperidine used therein, molar equivalent amounts of an appropriate 6-(3-indolyl) hexyl bromide and an appropriate lower-alkylated piperidine, there can be obtained the compounds of formula Ia listed below in Table 2 where $R_2$ and $R_3$ in each case are hydrogen and Alk in each case is ($CH_2$)$_6$.

TABLE 2 (FORMULA Ia)

| Example | $R_1$ | $R_4$ | $R_5$ | n |
|---|---|---|---|---|
| 37 | 6-HO | 2,4,6-tri-CH$_3$ | 4-HO | 1 |
| 38 | 5,6-OCH$_2$O | 2,2,4,6,6-penta-CH$_3$ | 4-HO | 1 |
| 39 | 6-CH$_3$S | 5-C$_2$H$_5$ | 2-CH$_2$CH$_2$OH | 1 |
| 40 | 6-CH$_3$SO$_2$ | 2,2-di-CH$_3$-6-(CH$_3$)$_2$CHCH$_2$ | 4-HO | 1 |

EXAMPLES 41–57

By following the manipulative procedure described above in Example 1, substituting for the 4-hydroxypiperidine used therein a molar equivalent amount of an appropriately substituted piperidine, there can be obtained the compounds of Formula Ia listed below in Table 3, where $R_1$, $R_2$, $R_3$ and $R_4$ in each case is hydrogen and Alk in each case is $(CH_2)_2$.

TABLE 3 (FORMULA Ia)

| Example | $R_5$ |
|---|---|
| 41 | 3-$CH_2CH_2OCOCH_3$ |
| 42 | 4-N(n-$C_4H_9$)$_2$ |
| 43 | 2-$CONHCH_2CH=CH_2$ |
| 44 | 4-N($CH_2CH=CH_2$)$_2$ |
| 45 | 4-$C_9H_5COO$ |
| 46 | 2-(2-Cl$C_6H_4COOCH_2CH_2$ |
| 47 | 4-(3-$CH_3C_6H_4COO$) |
| 48 | 4-(4-HO$C_6H_4COO$) |
| 49 | 4-(4-$CH_3OC_6H_4COO$) |
| 50 | 4-(3,4-O$CH_2OC_6H_3COO$) |
| 51 | 3-(4-$CH_3SC_6H_4COO$) |
| 52 | 3-(4-$CH_3SOC_6H_4COO$) |
| 53 | 3-(4-$CH_3SO_2C_6H_4COO$) |
| 54 | 4-(4-$CH_3CONHC_6H_4COOCH_2CH_2$) |
| 55 | 4-[3,4-($CH_3O$)$_2C_6H_3COOCH_2CH_2CH_2$] |
| 56 | 4-(3-Cl-4-$CH_3C_6H_3COOCH_2CH_2CH_2$) |
| 57 | 4-$C_5H_9CH_2$ |

EXAMPLE 58

3-{2-[2-(N-allylaminomethyl)-1-piperidyl]ethyl}indole

[Ia; $R_1$, $R_2$, $R_3$ and $R_4$ are H, Alk is $(CH_2)_2$, $R_5$ is 2-$CH_2NHCH_2CH=CH_2$]

By reacting the 3-{2-[2-(N-allylcarbamyl)-1-piperidyl]ethyl}indole prepared above in Example 43 with lithium aluminum hydride in an organic solvent inert under the conditions of the reaction, for example diethyl ether or tetrahydrofuran, there can be obtained 3-{2-[2-(N-allylaminomethyl)-1-piperidyl]ethyl}indole.

EXAMPLE 59

3-<2-{4-[2-(4-aminobenzoyloxy)ethyl-1-piperidyl]ethyl}>indole

[Ia; $R_1$, $R_2$, $R_3$ and $R_4$ are H, $R_5$ is 4-(4-$NH_2C_6H_4COOCH_2CH_2$), Alk is $CH_2CH_2$]

By heating the 3-<2-{4-[2-(4-acetylaminobenzoyloxy)-ethyl-1-piperidyl]ethyl}>indole prepared above in Example 54 with concentrated hydrochloric acid and isolating the product from an alkaline medium, there can be obtained 3-<2-{4-[2-(4-aminobenzoyloxy)ethyl-1-piperidyl]ethyl}>indole.

EXAMPLES 60–76

By following the manipulative procedure described above in Example 1, substituting for the 2-(3-indolyl)ethyl bromide used therein, a molar equivalent amount of an appropriate 2-(3-indolyl)ethyl halide substituted in the 1- and/or 2-positions, there can be obtained the compounds of Formula Ia listed below in Table 4 where $R_1$ and $R_4$ in each case is hydrogen, $R_5$ in each case is 4-HO, and Alk in each case is $CH_2CH_2$.

TABLE 4 (FORMULA Ia)

| Example | $R_2$ | $R_3$ |
|---|---|---|
| 60 | $CH_3$ | $CH_3$ |
| 61 | $C_6H_5CH_2$ | $CH_3$ |
| 62 | 4-Cl-3-$CH_3C_6H_3CH_2$ | H |
| 63 | 4-HO$C_6H_4CH_2$ | H |
| 64 | 3,4-($CH_2O$)$_2C_6H_3CH_2$ | H |
| 65 | 3,4-(O$CH_2OC_6H_3CH_2$) | $CH_3$ |
| 66 | 4-$CH_3SC_6H_4CH_2CH_2$ | H |
| 67 | 4-$CH_3SOC_6H_4CH_2CH_2$ | H |
| 68 | 4-$CH_3SO_2C_6H_4CH_2CH_2$ | H |
| 69 | $CH_3$ | $C_6H_5$ |
| 70 | H | 4-Cl-3-$CH_3C_5H_3$ |
| 71 | H | 4-HO$C_6H_4$ |
| 72 | H | 3,4-($CH_3O$)$_2C_6H_3$ |
| 73 | H | 3,4-(O$CH_2OC_6H_3$) |
| 74 | H | 4-$CH_3SC_6H_4$ |
| 75 | H | 4-$CH_3SOC_6H_4$ |
| 76 | H | 4-$CH_3SO_2C_6H_4$ |

EXAMPLE 77

5-chloro-2[2-(4-hydroxy-1-piperidyl)ethyl]indole

[Ib; $R_1$ is 5-Cl, $R_2$ and $R_4$ are H, Alk is $CH_2CH_2$, and $R_5$ is 4-HO]

By reducing 5-chloro-2-indole acetic acid with lithium aluminum hydride in an organic solvent inert under the conditions of the reaction, for example diethyl ether or tetrahydrofuran, there can be obtained 5-chloro-2-(2-indolyl)ethanol. By reacting the latter with a phosphorous trihalide or a thionyl halide, there can be obtained a 5-chloro-2-(2-indolyl)ethyl halide. By reacting the latter with two molar equivalents of 4-hydroxypiperidine following the manipulative procedure described above in Example 1, there can be obtained 5-chloro-2-[2-(4-hydroxy-1-piperidyl)ethyl]-indole.

EXAMPLE 78

5-methoxy-2-{6-[4-(2-hydroxyethyl)-1-piperidyl]hexyl}indole

[Ib; $R_1$ is 5-$CH_3O$, $R_2$ and $R_4$ are H, Alk is $(CH_2)_6$, and $R_5$ is 4-$CH_2CH_2OH$]

By reacting 5-methoxy-2-(2-indolyl)ethyl bromide with diethylmalonate in the presence of sodium ethoxide and saponifying and decarboxylating the product thus formed in an alkaline medium, there can be obtained γ-(5-methoxy-2-indolyl)butyric acid. By reducing the latter with lithium aluminum hydride in an organic solvent inert under the conditions of the reaction, for example diethyl ether or tetrahydrofuran, there can be obtained 4-(5-methoxy-2-indolyl)butyl alcohol. By reacting the latter with a phosphorous trihalide or a thionyl halide, there can be obtained a 4-(5-methoxy-2-indolyl)butyl halide. By reacting the latter with diethylmalonate in the presence of sodium ethoxide and saponifying and decarboxylating the product thus formed in an alkaline medium, there can be obtained ε-(5-methoxy-2-indolyl)hexanoic acid which on reduction with lithium aluminum hydride gives 6-(5-methoxy-2-indolyl)hexyl alcohol. By reacting the latter with a phosphorous trihalide or a thionyl halide, there can be obtained a 6-(5-methoxy-2-indolyl)hexyl halide. By reacting the latter with 4-(2-hydroxyethylpiperidine), there can be obtained 5-methoxy-2-{6-[4-(2-hydroxyethyl)-1-piperidyl]hexyl}indole.

EXAMPLES 79-82

By following the manipulative procedure described above in Example 1, substituting for the 2-(3-indolyl) ethyl bromide and the 4-hydroxypiperidine used therein, molar equivalent amounts of an appropriate 6-(2-indolyl) hexyl bromide and an appropriate lower-alkylated piperidine, there can be obtained the compounds of Formula Ib listed below in Table 5 where $R_2$ in each case is hydrogen and Alk in each case is $(CH_2)_6$.

TABLE 5 (FORMULA Ib)

| Example | $R_1$ | $R_4$ | $R_5$ | n |
|---------|-------|-------|-------|---|
| 79 | 6-HO | 2,4,6-tri-$CH_3$ | 4-HO | 1 |
| 80 | 5,6-O$CH_2$O | 2,2,4,6,6-penta-$CH_3$ | 4-HO | 1 |
| 81 | 6-$CH_3$S | 5-$C_2H_5$ | 2-$CH_2CH_2OH$ | 1 |
| 82 | 6-$CH_3SO_2$ | 2,2-di-$CH_3$-6-$(CH_3)_2CHCH_2$ | 4-HO | 1 |

EXAMPLES 83-98

By following the manipulative procedure described above in Example 77, substituting for the 4-hydroxypiperidine used therein a molar equivalent amount of an appropriately substituted piperidine, there can be obtained the compounds of Formula Ib listed below in Table 6, where $R_1$, $R_2$ and $R_4$ in each case is hydrogen and Alk in each case is $(CH_2)_2$.

TABLE 6 (FORMULA Ib)

| Example | $R_5$ |
|---------|-------|
| 83 | 3-$CH_2CH_2OCOCH_3$ |
| 84 | 4-N(n-$C_4H_9$)$_2$ |
| 85 | 2-$CONHCH_2CH=CH_2$ |
| 86 | 4-N($CH_2CH=CH_2$)$_2$ |
| 87 | 4-$C_6H_5COO$ |
| 88 | 2-(2-$ClC_6H_4COOCH_2CH_2$) |
| 89 | 4-(3-$CH_3C_6H_4COO$) |
| 90 | 4-(4-$HOC_6H_4COO$) |
| 91 | 4-(4-$CH_3OC_6H_4COO$) |
| 92 | 4-(3,4-O$CH_2$O$C_6H_3COO$) |
| 93 | 3-(4-$CH_3SC_6H_4COO$) |
| 94 | 3-(4-$CH_3SOC_6H_4COO$) |
| 95 | 3-(4-$CH_3SO_2C_6H_4COO$) |
| 96 | 4-(4-$CH_3CONHC_6H_4COOCH_2CH_2$) |
| 97 | 4-[3,4-$(CH_3O)_2C_6H_3COOCH_2CH_2CH_2$] |
| 98 | 4-(3-Cl-4-$CH_3C_6H_3COOCH_2CH_2CH_2$) |

EXAMPLE 99

2-{2-[2-(N-allylaminomethyl)-1-piperidyl]ethyl}indole

[Ib; $R_1$, $R_2$, and $R_4$ are H, Alk is $(CH_2)_2$, $R_5$ is 2-$CH_2NHCH_2CH=CH_2$]

By reacting the 2-{2-[2-(N-allylcarbamyl)-1-piperidyl]ethyl}indole prepared above in Example 85 with lithium aluminum hydride in an organic solvent inert under the conditions of the reaction, for example diethyl ether or tetrahydrofuran there can be obtained 2-{2-[2-(N-allylaminomethyl)-1-piperidyl]ethyl}indole.

EXAMPLE 100

2-<2-{4-[2-(4-aminobenzoyloxy)ethyl-1-piperidyl] ethyl}>indole

[Ib; $R_1$, $R_2$, and $R_4$ are H, Alk is $CH_2CH_2$, $R_5$ is 4-(4-$NH_2C_6H_4COOCH_2CH_2$)]

By reacting the 2-<2-{4-[2-(4-acetylaminobenzoyloxy)ethyl-1-piperidyl]ethyl}>indole prepared above in Example 96 with concentrated hydrochloric acid and isolating the product from an alkaline medium, there can be obtained 2-<2-{4-[2-(4-aminobenzoyloxy)ethyl-1-piperidyl]ethyl}>indole.

EXAMPLES 101-109

By following the manipulative procedure described above in Example 77, substituting for the 5-chloro-2-(2-indolyl)ethyl halide used therein a molar equivalent amount of an appropriate 2-(2-indolyl)ethyl halide substituted in the 1-position, there can be obtained the compounds of Formula Ib listed below in Table 7 where $R_1$ and $R_4$ in each case is hydrogen, $R_5$ in each case is 4-HO, and Alk in each case is $CH_2CH_2$.

TABLE 7 (FORMULA Ib)

| Example | $R_2$ |
|---------|-------|
| 101 | $CH_3$ |
| 102 | $C_6H_5CH_2$ |
| 103 | 4-Cl-3-$CH_3C_6H_3CH_2$ |
| 104 | 4-$HOC_6H_4CH_2$ |
| 105 | 3,4-$(CH_3O)_2C_6H_3CH_2$ |
| 106 | 3,4-(O$CH_2$O$C_6H_3CH_2$) |
| 107 | 4-$CH_3SC_6H_4CH_2CH_2$ |
| 108 | 4-$CH_3SOC_6H_4CH_2CH_2$ |
| 109 | 4-$CH_3SO_2C_6H_4CH_2CH_2$ |

EXAMPLE 110

4-hydroxy-1-[β-(3-indolyl)propionyl]piperidine

[IIa; $R_1$, $R_2$, $R_3$ and $R_4$ are H, $R_5$ is 4-OH, Alk' is $CH_2CH_2$]

A solution of 6.8 g. (0.05 mole) of isobutyl chloroformate in 100 ml. of acetone was added dropwise with stirring to a solution of 9.46 g. (0.05 mole) of β-3-indolyl)propionic acid and 5.50 g. (0.06 mole) of triethylamine in 200 ml. of acetone while maintaining the temperature at about −10° to −15° C. To the mixture was then added a solution of 5.06 g. (0.05 mole) of 4-hydroxypiperidine in 210 ml. of acetone. The reaction mixture was stirred at room temperature for about two hours, the triethylamine hydrochloride that had separated was filtered off, and the filtrate concentrated to dryness in vacuo. The residue was dissolved in 650 ml. of benzene and the benzene solution washed twice with water, twice with a saturated solution of sodium bicarbonate, twice again with water and finally twice with 1 N hydrochloric acid. The solution was then dried, taken to dryness in vacuo and the residue crystallized from an ethyl acetate-hexane mixture giving 7.7 g. of 4-hydroxy-1-[β-(3 - indolyl)propionyl]piperidine, M.P. 133.0–134.4° C. (corr.).

EXAMPLES 111–134

The compounds of Formulas IIa and IIc listed below in Table 8 were prepared according to the procedure described above in Example 110 from an appropriate (3- or 1-indolyl)-lower-alkanoic acid mixed anhydride and an appropriate substituted-piperidine. All melting points are corrected unless noted otherwise. The compounds of Formula IIc are indicated by an asterisk (*).

filtered. The insoluble material was recrystallized from a chloroform-hexane mixture giving 2.53 g. of 4-aminocarbamyl - 1 - [β - (3 - indolyl)propionyl]piperidine, M.P. 126.9–130.4° C. (corr.).

EXAMPLE 136

*3-[3-(4-hydroxy-1-piperidyl)propyl]indole*

[Ia; $R_1$, $R_1$, $R_2$, $R_3$ and $R_4$ are H, $R_5$ is 4-OH, Alk is $(CH_2)_3$]

A solution of 5.45 g. (0.02 mole) of 4-hydroxy-1-[β-(3-indolyl)propionyl]piperidine, prepared above in Example 110, in 270 ml. of dry tetrahydrofuran was treated with a solution of 1.52 g. (0.04 mole) of lithium aluminum hydride in 100 ml. of dry tetrahydrofuran according to the manipulative procedure described above in Example 34. The product was isolated in the form of the free base and recrystallized from an ethyl acetate-hexane mix-

TABLE 8

| Example | $R_1/R_2$ | $R_3/R_4$ | $R_5$/Alk' | M.P./Crystd. from— |
|---|---|---|---|---|
| 111 | H / H | H / 2,6-di-$CH_3$ | 4-C=O / $CH_2CH_2$ | 119–120° C. (uncorr.). ethyl acetate/hexane. |
| 112 | H / H | H / H | 4-$COOC_2H_5$ / $CH_2CH_2$ | 123–125° C. (uncorr.). benzene/hexane. |
| 113 | H / H | H / H | 4-$(CH_2)_3OH$ / $CH_2CH_2$ | Brown viscous oil. |
| 114 | H / H | H / H | 4-$(CH_2)_4OH$ / $CH_2CH_2$ | |
| 115 | H / H | H / H | 4-$(CH_2)_5OH$ / $CH_2CH_2$ | Brown viscous oil. |
| 116 | H / H | H / H | 4-$(CH_2)_6OH$ / $CH_2CH_2$ | Viscous oil. |
| 117 | H / H | H / H | 4-$(CH_2)_3OH$ / $(CH_2)_3$ | Dark viscous oil. |
| 118 | H / H | H / H | 4-$COOCH_3$ / $(CH_2)_3$ | 91.4–92.8° C. ethyl acetate/hexane. |
| 119 | H / H | H / H | 3-$COOCH_3$ / $CH_2CH_2$ | 107.4–108.4° C. ethyl acetate/hexane. |
| 120 | H / H | H / H | 2-$COOC_2H_5$ / $CH_2CH_2$ | 86.8–88.4° C. ethyl acetate/hexane. |
| 121 | H / H | H / H | 4-$CONH_2$ / $CH_2CH_2$ | 203.6–205.2° C. ethyl acetate/hexane. |
| 122 | H / H | H / H | 4-$CONHC_2H_5$ / $CH_2CH_2$ | 169.5–171.0° C. (uncorr.) ethyl acetate/hexane. |
| 123 | H / H | H / H | 4-$CON(C_2H_5)_2$ / $CH_2CH_2$ | 133.8–135.4° C. ethyl acetate. |
| 124 | H / H | H / H | 4-$NHCOCH_3$ / $CH_2CH_2$ | 188.8–190.2° C. ethanol/hexane. |
| *125 | H / | H / 2,6-di-$CH_3$ | 4-OH / $CH_2CH_2$ | Dark viscous oil. |
| *126 | / H | H / H | 4-OH / $CH_2CH_2$ | Tan oil. |
| *127 | H / | H / H | 4-$COOCH_3$ / $CH_2CH_2$ | Yellow viscous oil. |
| *128 | H / | H / H | 4-$CON(C_2H_5)_2$ / $CH_2CH_2$ | Yellow viscous oil. |
| *129 | H / | H / H | 4-$NHCOCH_3$ / $CH_2CH_2$ | 127.4–128.6° C. ethyl acetate. |
| 130 | H / H | H / H | 4-$COOCH_2CH(CH_3)_2$ / $CH_2CH_2$ | 107.8–109.2° C. ethyl acetate/hexane. |
| 131 | H / H | H / H | 3-$CONHC_2H_5$ / $CH_2CH_2$ | 157.4–158.4° C. |
| *132 | H / | H / H | 2-$COOC_2H_5$ / $CH_2CH_2$ | 95.2–97.2° C. hexane. |
| *133 | H / | H / H | 3-$CONHC_2H_5$ / $CH_2CH_2$ | 111.2–112.8° C. |
| 134 | H / H | H / H | 4-$COOCH_3$ / $CH_2CH_2$ | 123.2–124.2° C. ethyl acetate/hexane. |

*Compounds of Formula IIc

EXAMPLE 135

*4-aminocarbamyl-1-[β-(3-indolyl)propionyl]piperidine*

[IIa; $R_1$, $R_2$, $R_3$ and $R_4$ are H, $R_5$ is 4-$CONHNH_2$, Alk is $(CH_2)_3$]

A solution of 4.1 g. (0.13 mole) of the 4-carbomethoxy-1-[β-(3-indolyl)propionyl]piperidine, prepared above in Example 134, in 12 ml. of 100% hydrazine hydrate and 60 ml. of isopropyl alcohol, was heated under reflux for about seven hours. The mixture was taken to dryness in vacuo, and the resulting solid was slurried with 25 ml. of saturated aqueous sodium bicarbonate solution and then ture giving 2.44 g. of 3-[3-(4-hydroxyl-1-piperidyl)propyl]indole, M.P. 195.2–198.2° C. (corr.).

EXAMPLES 137–155

The compounds of Formulas Ia and Ic listed below in Table 9 were prepared by reducing the respective compounds of Examples 111–129 with lithium aluminum hydride in tetrahydrofuran according to the manipulative procedure described above in Example 34. All melting points are corrected unless noted otherwise. The compounds of Formula Ic are indicated by an asterisk (*).

TABLE 9

| Example | $R_1R_2$ | $R_3R_4$ | $R_5$/Alk | Base or salt | M.P./Cryst. from— |
|---|---|---|---|---|---|
| 137 | H H | H 2,6-di-$CH_3$ | 4-OH ($CH_2)_3$ | Base | 198.2–201.2 °C. ethyl acetate/hexane. |
| 138 | H H | H H | 4-$CH_2$OH ($CH_2)_3$ | do | 151.8–153.2° C. ethyl acetate. |
| 139 | H H | H H | 4-($CH_2)_3$OH ($CH_2)_3$ | do | 156.0–157.8° C. ethyl acetate/hexane. |
| 140 | H H | H H | 4-($CH_2)_4$OH ($CH_2)_3$ | do | 130.0–133.2° C. ethyl acetate/hexane. |
| 141 | H H | H H | 4-($CH_2)_5$OH ($CH_2)_3$ | do | 142.0–143.4° C. ethyl acetate/hexane. |
| 142 | H H | H H | 4-($CH_2)_6$OH ($CH_2)_3$ | HCl | 182.4–184.6° C. water. |
| 143 | H H | H H | 4-($CH_2)_3$OH ($CH_2)_4$ | Base | 140.2–142.0° C. ethyl acetate/hexane. |
| 144 | H H | H H | 4-$CH_2$OH ($CH_2)_4$ | do | 164.2–165.0° C. ethyl acetate. |
| 145 | H H | H H | 3-$CH_2$OH ($CH_2)_3$ | do | 160.8–163.8° C. ethyl acetate. |
| 146 | H H | H H | 2-$CH_2$OH ($CH_2)_3$ | do | 151.4–154.6° C. ethyl acetate. |
| 147 | H H | H H | 4-$CH_2NH_2$ ($CH_2)_3$ | do | 115.6–116.0° C. ethyl acetate/hexane. |
| 148 | H H | H H | 4-$CH_2$NH$C_2H_5$ ($CH_2)_3$ | 2HCl | 245.4–247.2° C. ethanol. |
| 149 | H H | H H | 4-$CH_2$N($C_2H_5)_2$ ($CH_2)_3$ | 2HCl | 202.4–208° C. ethanol. |
| 150 | H H | H H | 4-NH$C_2H_5$ ($CH_2)_3$ | 2HCl | 277.2–279.2° C. methanol/ethanol. |
| *151 | H H | H 2,6-di-$CH_3$ | 4-OH ($CH_2)_3$ | HCl | 241.8–243.4° C. isopropanol/ether. |
| *152 | H H | H H | 4-OH ($CH_2)_3$ | Base | 90.0–91.0° C. benzene/hexane. |
| *153 | H H | H H | 4-$CH_2$OH ($CH_2)_3$ | do | 85.8–87.0° C. ethyl acetate/hexane. |
| *154 | H H | H H | 4-$CH_2$N($C_2H_5)_2$ ($CH_2)_3$ | 2HCl | 219.4–220.6° C. isopropanol/ether. |
| *155 | H H | H H | 4-NH$C_2H_5$ ($CH_2)_3$ | 2HCl | 264.6–266.2° C. isopropanol/ether. |

*Compound of formula Ic.

EXAMPLES 156–159

By following the manipulative procedure described above in Example 110, substituting for the β-(3-indolyl)-propionic acid and the 4-hydroxypiperidine used therein, molar equivalent amounts of an appropriate ε-(3-indolyl)-caproic acid and an appropriate lower-alkylated substituted-piperidine, there can be obtained the compounds of Formula IIa listed below in Table 10 where $R_2$ and $R_3$ in each case are hydrogen and Alk' in each case is $(CH_2)_5$.

TABLE 10 (FORMULA IIa)

| Example | $R_1$ | $R_4$ | $R_5$ | n |
|---|---|---|---|---|
| 156 | 6-HO | 2,4,6-tri-$CH_3$ | 4-HO | 1 |
| 157 | 5,6-O$CH_2$O | 2,2,4,6,6-penta-$CH_3$ | 4-HO | 1 |
| 158 | 6-$CH_3$S | 5-$C_2H_5$ | 2-$CH_2CH_2$OH | 1 |
| 159 | 6-$CH_3SO_2$ | 2,2-di-$CH_3$-6-($CH_3)_2$CH$CH_2$ | 4-HO | 1 |

EXAMPLES 160–177

By following the manipulative procedure described above in Example 110 substituting for the 4-hydroxypiperidine used therein a molar equivalent amount of an appropriately substituted piperidine, there can be obtained the compounds of Formula IIa listed below in Table 11 where $R_1$, $R_2$, $R_3$ and $R_4$ in each case are hydrogen and Alk' in each case is $(CH_2)_2$.

TABLE 11

| Example | $R_5$ |
|---|---|
| 160 | 3-$CH_2CH_2$OCO$CH_3$ |
| 161 | 4-N(n-$C_4H_9)_2$ |
| 162 | 2-CONH$CH_2$CH=$CH_2$ |
| 163 | 4-N($CH_2$CH=$CH_2)_2$ |
| 164 | 4-$C_6H_5$COO |
| 165 | 2-(2-Cl$C_6H_4$COO$CH_2CH_2$) |
| 166 | 4-(3-$CH_3C_6H_4$COO) |
| 167 | 4-(4-HO$C_6H_4$COO) |
| 168 | 4-(4-$CH_3OC_6H_4$COO) |
| 169 | 4-(3,4-O$CH_2$O$C_6H_3$COO) |
| 170 | 3-(4-$CH_3SC_6H_4$COO) |
| 171 | 3-(4-$CH_3SOC_6H_4$COO) |
| 172 | 3-(4-$CH_3SO_2C_6H_4$COO) |
| 173 | 4-(4-$CH_3$CONH$C_6H_4$COO$CH_2CH_2$) |
| 174 | 4-[3,4-($CH_3$O)$_2C_6H_3$COO$CH_2CH_2$] |
| 175 | 4-(3-Cl-4-$CH_3C_6H_3$COO$CH_2CH_2$) |
| 176 | 4-$C_6H_{11}CH_2$ |
| 177 | 4-$C_5H_9CH_2$ |

EXAMPLES 178–194

By following the manipulative procedure described above in Example 110, substituting for the β-(3-indolyl)-propionic acid used therein a molar equivalent amount of an appropriate β-(3-indolyl)propionic acid substituted in the 1- and/or 2-positions, there can be obtained the compounds of Formula IIa listed below in Table 12 where $R_1$ and $R_4$ in each case is hydrogen, $R_5$ in each case is 4-HO, and Alk in each case is $CH_2CH_2$.

TABLE 12 (FORMULA IIa)

| Example | $R_2$ | $R_3$ |
|---|---|---|
| 178 | $CH_3$ | $CH_3$ |
| 179 | $C_6H_5CH_2$ | $CH_3$ |
| 180 | 4-Cl-3-$CH_3C_6H_3CH_2$ | H |
| 181 | 4-HO$C_6H_4CH_2$ | H |
| 182 | 3,4-($CH_3$O)$_2C_6H_3CH_2$ | H |
| 183 | 3,4-(O$CH_2$O$C_6H_3CH_2$) | $CH_3$ |
| 184 | 4-$CH_3SC_6H_4CH_2CH_2$ | H |
| 185 | 4-$CH_3SOC_6H_4CH_2CH_2$ | H |
| 186 | 4-$CH_3SO_2C_6H_4CH_2CH_2$ | H |
| 187 | $CH_3$ | $C_6H_5$ |
| 188 | H | 4-Cl-3-$CH_3C_6H_3$ |
| 189 | H | 4-HO$C_6H_4$ |
| 190 | H | 3,4-($CH_3$O)$_2C_6H_3$ |
| 191 | H | 3,4-(O$CH_2$O$C_6H_3$) |
| 192 | H | 4-$CH_3SC_6H_4$ |
| 193 | H | 4-$CH_3SOC_6H_4$ |
| 194 | H | 4-$CH_3SO_2C_6H_4$ |

EXAMPLE 195

*4-hydroxy-1-[α-(2-indolyl)acetyl]piperidine*

[IIb; $R_1$, $R_2$ and $R_4$ are H, Alk' is $CH_2$, and $R_5$ is 4-OH]

By reacting 2-indole acetic acid with isobutyl chloroformate and triethylamine according to the manipulative procedure described above in Example 110 and reacting the resulting mixed anhydride with 4-hydroxypiperidine according to the manipulative procedure described above in Example 110, there can be obtained 4-hydroxy-1-[α-(2-indolyl)acetyl]piperidine.

EXAMPLE 196

*4-hydroxy-1-[ε-(2-indolyl)hexanoyl]piperidine*

[IIb; $R_1$, $R_2$, and $R_4$ are H, Alk' is $(CH_2)_5$ and $R_5$ is 4-OH]

By reacting ε-(2-indolyl)hexanoic acid with isobutyl chloroformate and triethylamine and reacting the resulting mixed anhydride with 4-hydroxypiperidine according to the manipulative procedure described above in Example 110, there can be obtained 4-hydroxy-1-[ε-(2-indolyl)hexanoyl]piperidine.

EXAMPLES 197–200

By following the manipulative procedure described above in Example 110, substituting for the β-(3-indolyl)propionic acid and the 4-hydroxypiperidine used therein molar equivalent amounts of an appropriate ε-(2-indolyl)hexanoic acid and an appropriate lower-alkylated substituted-piperidine, there can be obtained the compounds of Formula IIb listed below in Table 13 where $R_2$ in each case is hydrogen and Alk in each case is $(CH_2)_5$.

TABLE 13 (FORMULA IIb)

| Example | $R_1$ | $R_4$ | $R_5$ | n |
|---|---|---|---|---|
| 197 | 6-HO | 2,4,6-tri-$CH_3$ | 4-HO | 1 |
| 198 | 5,6-$OCH_2O$ | 2,2,4,6,6-penta-$CH_3$ | 4-HO | 1 |
| 199 | 6-$CH_3S$ | 5-$C_2H_5$ | 2-$CH_2CH_2OH$ | 1 |
| 200 | 6-$CH_3SO_2$ | 2,2-di-$CH_3$-6-$(CH_3)_2CHCH_2$ | 4-HO | 1 |

EXAMPLES 201–216

By following the manipulative procedure described above in Example 110, substituting for the 4-hydroxypiperidine used therein a molar equivalent amount of an appropriately substituted piperidine, there can be obtained the compounds of Formula IIb listed below in Table 14, where $R_1$, $R_2$ and $R_4$ in each case is hydrogen and Alk' in each case is $CH_2CH_2$.

TABLE 14 (FORMULA IIb)

| Example | $R_5$ |
|---|---|
| 201 | 3-$CH_2CH_2OCOCH_3$ |
| 202 | 4-$N(n-C_4H_9)_2$ |
| 203 | 2-$CONHCH_2CH=CH_2$ |
| 204 | 4-$N(CH_2CH=CH_2)_3$ |
| 205 | 4-$C_6H_5COO$ |
| 206 | 2-(2-$ClC_6H_4COOCH_2CH_2$) |
| 207 | 4-(3-$CH_3C_6H_4COO$) |
| 208 | 4-(4-$HOC_6H_4COO$) |
| 209 | 4-(4-$CH_3OC_6H_4COO$) |
| 210 | 4-(3,4-$OCH_2OC_6H_3COO$) |
| 211 | 3-(4-$CH_3SC_6H_4COO$) |
| 212 | 3-(4-$CH_3SOC_6H_4COO$) |
| 213 | 3-(4-$CH_3SO_2C_6H_4COO$) |
| 214 | 4-(4-$CH_3CONHC_6H_4COOCH_2CH_2$) |
| 215 | 4-[3,4-$(CH_3O)_2C_6H_3COOCH_2CH_2CH_2$] |
| 216 | 4-(3-Cl-4-$CH_3C_6H_3COOCH_2CH_2CH_2$) |

EXAMPLES 217–225

By following the manipulative procedure described above in Example 110 substituting for the β-(3-indolyl)propionic acid used therein a molar equivalent amount of an appropriate β-(2-indolyl)propionic acid substituted in the 1-position of the indole nucleus, there can be obtained the compounds of formula IIb listed below in Table 15 where $R_1$ and $R_4$ in each case is hydrogen, $R_5$ in each case is 4-HO, and Alk' in each case is $CH_2CH_2$.

TABLE 15 (FORMULA IIb)

| Example | $R_2$ |
|---|---|
| 217 | $CH_3$ |
| 218 | $C_6H_5CH_2$ |
| 219 | 4-Cl-3-$CH_3C_6H_3CH_2$ |
| 220 | 4-$HOC_6H_4CH_2$ |
| 221 | 3,4-$(CH_3O)_2C_6H_3CH_2$ |
| 222 | 3,4-$OCH_2OC_6H_3CH_2$ |
| 223 | 4-$CH_3SC_6H_4CH_2CH_2$ |
| 224 | 4-$CH_3SOC_6H_4CH_2CH_2$ |
| 225 | 4-$CH_3SO_2C_6H_4CH_2CH_2$ |

EXAMPLE 226

*4-carbomethoxy-1-(3-indolylglyoxalyl)piperidine*

[IIIa; $R_1$, $R_2$, $R_3$ and $R_4$ are H, $R_5$ is 4-$COOCH_3$]

To a stirred solution of 9.3 g. (0.04 mole) of 4-carbomethoxypiperidine in 200 ml. of tetrahydrofuran was added dropwise over a period of about forty-five minutes a solution of 14.3 g. (0.1 mole) of 3-indolylglyoxalyl chloride while maintaining the temperature at −10 to −20° C. When all the solution had been added the mixture was allowed to stand at about 4° C. for twelve hours. The mixture was filtered and the filtrate evaporated to dryness in vacuo leaving a reddish oil. The latter was taken into chloroform, washed twice with dilute hydrochloric acid, three times with water, twice with saturated sodium bicarbonate, and three times again with water. The chloroform solution was then dried, taken to dryness in vacuo and the residual red viscous oil was crystallized from an ethyl acetate-hexane mixture giving 10.0 g. of 4-carbomethoxy-1-(3-indolylglyoxalyl)piperidine, M.P. 135.4–136.0° C. (corr.).

EXAMPLE 227

*3-[2-(4-hydroxymethyl-1-piperidyl)ethyl]indole*

[Ia; $R_1$, $R_2$, $R_3$ and $R_4$ are H, $R_5$ is 4-$CH_2OH$, Alk is $CH_2CH_2$]

By reacting the 4-carbomethoxy-1-(3-indolylglyoxalyl)piperidine, prepared above in Example 226 with lithium aluminum hydride in an organic solvent inert under the conditions of the reaction, for example, tetrahydrofuran, according to the manipulative procedure described above in Example 34, there can be obtained 3-[2-(4-hydroxymethyl-1-piperidyl)ethyl]indole.

EXAMPLES 228–231

By following the manipulative procedure described above in Example 226 substituting for the 3-indolylglyoxalyl chloride and the 4-carbomethoxypiperidine used therein molar equivalent amounts of an appropriate 3-indolylglyoxalyl halide and an appropriate lower-alkylated piperdine, there can be obtained the compounds of Formula IIIa listed below in Table 16 where $R_3$ in each case is hydrogen.

TABLE 16 (FORMULA IIIa)

| Ex. | $R_1$ | $R_4$ | $R_5$ |
|---|---|---|---|
| 228 | 6-HO | 2,4,6-tri-$CH_3$ | 4-HO |
| 229 | 5,6-$OCH_2O$ | 2,2,4,6,6-penta-$CH_3$ | 4-HO |
| 230 | 6-$CH_3S$ | 5-$C_2H_5$ | 2-$CH_2CH_2OH$ |
| 231 | 6-$CH_3SO_2$ | 2,2-di-$CH_3$-6-$(CH_3)_2CHCH_2$ | 4-HO |

EXAMPLES 232–254

By following the manipulative procedure described above in Example 226, substituting for the 4-carbomethoxypiperidine used therein a molar equivalent amount of an appropriately substituted piperidine, there can be obtained the compounds of Formula IIIa listed below in Table 17 where $R_1$, $R_2$, $R_3$ and $R_4$ in each case is hydrogen.

TABLE 17 (FORMULA IIIa)

| Example | $R_5$ |
|---|---|
| 232 | 4-HO |
| 233 | 2-$CH_2CH_2OH$ |
| 234 | 3-$CONH_2$ |
| 235 | 4-$CONHC_2H_5$ |
| 236 | 4-$CON(C_2H_5)_2$ |
| 237 | 3-$CH_2CH_2OCOCH_3$ |
| 238 | 4-$N(n-C_4H_9)_2$ |
| 239 | 2-$CONHCH_2CH=CH_2$ |
| 240 | 4-$N(CH_2CH=CH_2)_2$ |
| 241 | 4-$C_6H_5COO$ |
| 242 | 2-(2-$ClC_6H_4COOCH_2CH_2$) |
| 243 | 4-(3-$CH_3C_6H_4COO$) |
| 244 | 4-(4-$HOC_6H_4COO$) |
| 245 | 4-(4-$CH_3OC_6H_4COO$) |
| 246 | 4-(3,4-$OCH_2OC_6H_3COO$) |
| 247 | 3-(4-$CH_3SC_6H_4COO$) |
| 248 | 3-(4-$CH_3SOC_6H_4COO$) |
| 249 | 3-(4-$CH_3SO_2C_6H_4COO$) |
| 250 | 4-(4-$CH_3CONHC_6H_4COOCH_2CH_2$) |
| 251 | 4-[3,4-$(CH_3O)_2C_6H_3COOCH_2CH_2CH_2$] |
| 252 | 4-(3-Cl-4-$CH_3C_6H_3COOCH_2CH_2CH_2$) |
| 253 | 4-$C_6H_{11}CH_2$ |
| 254 | 4-$C_5H_9CH_2$ |

EXAMPLE 255

*6-benzyloxy-1-[3-(4-hydroxy-1-piperidyl)propyl]indole*

[Ic; $R_1$ is 6-$C_6H_5CH_2O$, $R_3$ and $R_4$ are H, $R_5$ is 4-OH, Alk is $(CH_2)_3$]

By following the manipulative procedure described above in Example 1, substituting for the 2-(3-indolyl)ethyl bromide used therein a molar equivalent amount of a 3-(6-benzyloxy-1-indolyl)propyl halide, there can be obtained 6-benzyloxy-1-[3-(4-hydroxy-1-piperidyl)propyl]indole.

EXAMPLE 256

*4-hydroxy-1-[β-(6-benzyloxy-1-indolyl)propionyl]-piperidine*

[IIc; $R_1$ is 6-$C_6H_5CH_2O$, $R_3$ and $R_4$ are H, $R_5$ is 4-OH, Alk' is $CH_2CH_2$]

By following the manipulative procedure described above in Example 110, substituting for the β-(3-indolyl)-propionic acid used therein a molar equivalent amount of β-(6-benzyloxy-1-indolyl)propionic acid, there can be obtained 4-hydroxy-1-[β-(6-benzyloxy-1-indolyl)propionyl]-piperidine.

EXAMPLE 257

*4-carbomethoxy-1-(6-benzyloxy-3-indolylglyoxalyl)-piperidine*

[IIIa; $R_1$ is $C_6H_5CH_2O$, $R_2$, $R_3$ and $R_4$ are H, $R_5$ is 4-$COOC_2H_5$]

By following the manipulative procedure described above in Example 226, substituting for the 3-indolylglyoxalyl chloride used therein a molar equivalent amount of 6-benzyloxy-3-glyoxalyl chloride, there can be obtained 4-carbomethoxy-1-(6-benzyloxy-3-indolylglyoxalyl)-piperidine.

EXAMPLE 258

*3-{2-[4-(3,4,5-trimethoxybenzoyloxymethyl)-1-piperidyl]ethyl}indole*

[Ia; $R_1$, $R_2$, $R_3$ and $R_4$ are H, $R_5$ is 4-[3,4,5-$(CH_3O)_3$-$C_6H_2COOCH_2$], Alk is $CH_2CH_2$]

A solution of 2.5 g. (0.01 mole) of the 3-[2-(4-hydroxymethyl-1-piperidyl)ethyl] indole, prepared above in Example 3, and 2.5 g. (0.01 mole) of 3,4,5-trimethoxybenzoyl chloride in 75 ml. of acetonitrile was heated under reflux for eighteen hours. The reaction mixture was then taken to dryness. The residue was dissolved in hot water, the solution basified with 10% aqueous sodium bicarbonate solution, and the precipitated solid collected, dried, and recrystallized from methanol giving 2.5 g. of 3-{2-[4-(3,4,5-trimethoxybenzoyloxymethyl)-1-piperidyl]ethyl}indole, M.P. 142.5–143.4° C. (corr.).

EXAMPLE 259

*2-methyl-3-{2[4-(2-hydroxethyl)-1-piperidyl]ethyl}indole hydrochloride*

[Ia; $R_1$, $R_2$ and $R_4$ are H, $R_3$ is $CH_3$, $R_5$ is 4-$CH_2CH_2OH$, Alk is $CH_2CH_2$]

A mixture of 103 g. (0.8 mole) of 4-(2-hydroxyethyl)-piperidine, 193 g. (1.6 mole) of 1-chloro-4-pentanone and 254 g. (2.4 moles) of anhydrous sodium carbonate in 400 ml. of xylene was heated and stirred on a steam bath for twenty-four hours. The mixture was filtered to remove the precipitated inorganic salts, the filter cake was washed with absolute ether, the washings being combined with the main filtrate, and the filtrate evaporated to dryness. Distillation of the residual oil in vacuo gave 117 g. of 1-(3-acetylpropyl)-4-(2-hydroxyethyl)piperidine, B.P. 150–160° C./0.6 mm.; $n_D^{25}=1.4846$.

The 1-(3-acetylpropyl)-4-(2-hydroxyethyl)piperidine (10.7 g., 0.05 mole) prepared above together with 5.4 g. (0.05 mole) of phenylhydrazine were dissolved in 150 ml. of absolute ethanol containing 15.6 ml. of 6.5 N ethanolic hydrogen chloride. The mixture was refluxed and stirred for twenty-four hours, an additional 7.8 ml. of ethanolic hydrogen chloride being added after the first half hour of refluxing. The mixture was then cooled, filtered, the filter cake slurried with water, filtered again, and washed first with isopropanol then with n-pentane and dried to give 10 g. of 2-methyl-3-{2-[4-(2-hydroxyethyl)-1-piperidyl]ethyl}-indole hydrochloride, M.P. 256.4–260.8° C. (corr.).

EXAMPLE 260

*2-methyl-5,6-methylenedioxy-3-{2-[4-(2-hydroxyethyl)-1-piperidyl]-ethyl}-indole hydrochloride* [Ia; $R_1$ is 5,6-$OCH_2O$, $R_2$ and $R_4$ are H, $R_3$ is $CH_3$, $R_5$ is 4-$CH_2CH_2OH$, Alk is $CH_2CH_2$] was prepared from 9.5 g. (0.05 mole) of 3,4-methylenedioxyphenylhydrazine hydrochloride and 10.7 g. (0.05 mole) of 1-(3-acetylpropyl)-4-(2-hydroxyethyl)piperidine in 125 ml. of absolute ethanol containing a total of 15.6 ml. of ethanolic hydrogen chloride following the manipulative procedure described above in Example 259. The crude product was purified by slurrying with water, filtering and washing the filter with isopropanol and n-pentane to give 14 g. of 2-methyl-5,6-methylenedioxy-3-{2-[4-(2-hydroxyethyl)-1-piperidyl]ethyl}indole hydrochloride, M.P. 268.8–270.0° C. (corr.).

EXAMPLE 261

*1-{3-[4-(5-hydroxypentyl)-1-piperidyl]propyl}indole 2,3,4,5,6-pentachlorobenzochloride*

[Ic; $R_1$, $R_3$ and $R_4$ are H, $R_5$ is 4-$(CH_2)_5OH$, Alk is $(CH_2)_3$]

A mixture of 8.74 g. (0.04 mole) of 3-(1-indolyl)propyl chloride, 11.2 g. (0.05 mole) of 4-(5-hydroxypentyl)piperidine hydrochloride, and 10.0 g. (0.12 mole) of sodium bicarbonate in 300 ml. of acetonitrile was refluxed and stirred for forty-eight hours. The reaction mixture was filtered, and the filtrate taken to dryness leaving 13.9 g. of 1-{3-4[-(5-hydroxypentyl)-1-piperidyl]propyl}indole as a yellow viscous oil.

The latter was dissolved in 325 ml. of acetonitrile along with 15.8 g. (0.05 mole) of 2,3,4,5,6-pentachlorobenzyl chloride. The mixture was refluxed for forty-eight hours and the solvent then taken off under reduced pressure and the residue caused to crystallize by trituration with ether. The solid was recrystallized from isopropanol to give 2.2 g. of 1-{3-[4-(5-hydroxypentyl)-1-piperidyl]propyl}indole 2,3,4,5,6 - pentachlorobenzochloride, M.P. 183.0–184.0° C. (corr.).

EXAMPLE 262

1 - {3-[4-(3-hydroxypropyl)-1-piperidyl]propyl}indole 2,3,4,5,6-pentachlorobenzochloride [Ic; $R_1$, $R_3$, and $R_4$ are H, $R_5$ is 4-$(CH_2)_3OH$, Alk is $(CH_2)_3$] was prepared from the 1-{3-[4-(3-hydroxypropyl)-1-piperidyl]propyl}indole prepared above in Example 13, and 2,3,4,5,6-pentachlorobenzyl chloride in acetonitrile according to the manipulative procedure described above in Example 261. The product was recrystallized from isopropanol to give 1-{3-[4-(3-hydroxypropyl) - 1 - piperidyl]propyl}indole 2,3,4,5,6-pentachlorobenzochloride, M.P. 159.7–163.5° C. (corr.).

EXAMPLE 263

3-{3-[4-(6-hydroxyhexyl) - 1 - piperidyl]propyl}indole 2,3,4,5,6-pentachlorobenzochloride [Ia; $R_1$, $R_2$, $R_3$, and $R_4$ are H, $R_5$ is 4-$(CH_2)_6OH$, Alk is $(CH_2)_3$] was prepared from the 3-{3-[4-(6-hydroxyhexyl)-1-piperidy]propyl}indole prepared above in Example 142 and 2,3,4,5,6-pentachlorobenzyl chloride in acetonitrile according to the manipulative procedure described above in Example 261. The product was recrystallized from isopropanol to give 3 - {3-[4-(6-hydroxyhexyl)-1-piperidyl]propyl}indole 2,3,4,5,6 - pentachlorobenzochloride, M.P. 163.6–171.2° C. (corr.).

The compounds of Formulas Ia, b, and c have been shown to possess hypotensive, sedative, anti-inflammatory, monoamine oxidase inhibitory, coronary dilator, adrenolytic, tranquilizing, and anti-bacterial activities. As representative of these various activities shown by the compounds of the invention are the following:

The minimum effective hypotensive dose (MEHD) of 3-[2-(4-hydroxy-1-piperidyl)ethyl]indole, prepared above in Example 1, administered subcutaneously in the renal hypertensive rat, was found to be about 1.0 mg./kg.; the MEHD of 3-[2-(2-hydroxymethyl-1-piperidyl)ethyl]indole, prepared above in Example 4, administered intravenously in the anesthetized dog, was found to be 1.0 mg./kg.; and the MEHD of 3-[2-(4-isopropylidenehydrazono-1-piperidyl)-ethyl]indole, prepared above in Example 31, administered subcutaneously in the renal hypertensive rat, was found to be about 1.0 mg./kg.;

Sedative activity was determined by the potentiation of hexobarbital induced sleeping time in mice. Thus the effective dose, $ED_{50}$, of 3-{2-[4-(1-hydroxyethyl)-1-piperidyl]ethyl}indole hydrochloride, prepared above in Example 6, in inducing sleep in mice to which 40 mg./kg. of hexobarbital had been administered was found to be 106±46.5 mg./kg. (oral);

3-[3-(4-hydroxymethyl-1-piperidyl)propyl]indole, prepared above in Example 138, and 1-[3-(2,6-dimethyl-4-hydroxy-1-piperidyl)propyl]indole hydrochloride, prepared above in Example 151, were found to have anti-inflammatory activity as evidenced by inhibition of dextran edema in rats when administered orally at a dose level of 100 mg./kg./day for three days;

3 - [2-(4-isopropylidenehydrazono-1-piperidyl)ethyl]indole, prepared above in Example 31, 1-[3-(4-hydroxymethyl-1-piperidyl)-propyl]indole, prepared above in Example 153, and 3-[2-(4-aminocarbamyl-1-piperidyl)-ethyl]indole, prepared above in Example 30, were found to be about one-tenth as active as iproniazid as a monoamine oxidase inhibiting agent;

3 - {3-[4-(3-hydroxypropyl)-1-piperidyl]propyl}indole, prepared above in Example 139, was found to produce 7.8% coronary dilatation at a dose level of 0.1 mg./kg. in the isolated rabbit heart;

3-{3-[4-(6-hydroxyhexyl) - 1 - piperidyl]propyl}indole hydrochloride, prepared above in Example 142, administered intravenously in rats, showed adrenolytic activity as evidenced by antagonism of the pressor effects of epinephrine. The effective dose, $ED_{50}$, in antagonizing epinephrine was found to be 730±216.1 mcg./kg.;

3-{2-[4-(1-hydroxyethyl)-1-piperidyl]ethyl}indole hydrochloride, prepared above in Example 6, administered orally produced tranquilization of mice as evidenced by the reaction of the mice to being touched lightly on the vibrissae. The effective dose, $ED_{50}$, in producing tranquilization in mice was found to be about 128 mg./kg.;

In standard serial dilution tests, 3-[3-(2,6-dimethyl-4-hydroxy-1-piperidyl)propyl]indole, prepared above in Example 137, was found to be bacteriostatically effective at a dilution of 1:2,000 vs. *Staph. aureus* and *Cl. welchii*, and about 1:1,000 vs. *E. typhi* and *Ps. aeruginosa*.

The compounds of Formulas IIa, b, and c have been shown to possess hypotensive and coronary dilator activities. As representative of these activities shown by the compounds are the following:

The MEHD of 4-aminocarbamyl-1-[β-(3-indolyl)propionyl]piperidine, prepared above in Example 135, administered subcutaneously in the renal hypertensive rat was found to be 1.0 mg./kg.;

4 - acetylamino-1-[β - (3-indolyl)propionyl]piperidine, prepared above in Example 124, 4-(N,N-diethylcarbamyl) - 1 - [β-(3 - indolyl)propionyl]piperidine, prepared above in Example 123, and 4-carbomethoxy-1-[β-(3-indolyl)propionyl]piperidine, prepared above in Example 134, were found to produce 1.6%, 3.1%, and 2.4% coronary dilatation, respectively, at a dose level of 0.1 mg./kg. in the isolated rabbit heart.

I claim:

1. A compound having the formula

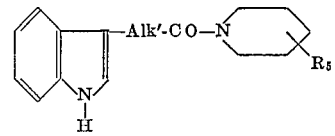

where $R_5$ is carbo-lower-alkoxy of from one to six carbon atoms in the lower-alkoxy moiety and Alk' is lower-alkylene of from one to six cargon atoms and interposing from one to five carbon atoms between the indolyl group and the carbonyl carbon atom of the lower-alkanoyl group.

2. A compound having the formula

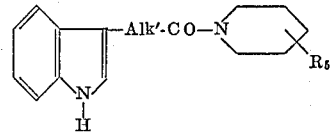

where $R_5$ is N,N-di-lower-alkylcarbamyl and Alk' is lower-alkylene of from one to six carbon atoms and interposing from one to five carbon atoms between the indolyl group and the carbonyl carbon atom of the lower-alkanoyl group.

3. A compound having the formula

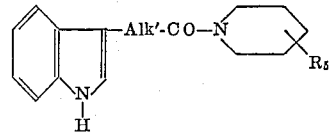

where $R_5$ is aminocarbamyl and Alk' is lower-alkylene of from one to six carbon atoms and interposing from one to five carbon atoms between the indolyl group and the carbonyl carbon atom of the lower-alkanoyl group.

4. 4 - carbomethoxy - 1 - [β - (3 - indolyl)propionyl] piperidine.

5. 4 - (N,N-diethylcarbamyl) - 1 - [β - (3 - indolyl) propionyl]-piperidine.

6. 4 - aminocarbamyl - 1 - [β - (3 - indolyl)propionyl] piperidine.

7. A compound having the formula

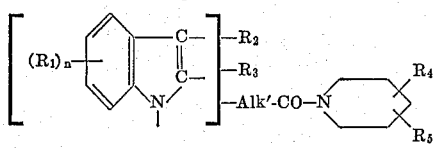

where any one of the three free valences on the indole ring is taken up by the 1-[lower-alkanoyl]piperidine group and the valences at the 1- and 2-positions, when not taken up by the 1-[lower-alkanoyl]piperidine group, are taken up by the groups $R_2$ and $R_3$, respectively; and where $R_1$ is a member of the group consisting of hydrogen, hydroxy, halogen, lower-alkyl, lower-alkoxy, methylenedioxy, lower-alkylmercapto, lower-alkylsulfonyl, and benzyloxy; $R_2$ is a member of the group consisting of hydrogen, lower-alkyl, phenyl-lower-alkyl, and $Y_1$-phenyl-lower-alkyl; $R_3$ is a member of the group consisting of hydrogen, lower-alkyl, phenyl, and $Y_2$-phenyl; $R_4$ is a member of the group consisting of hydrogen and from one to five lower-alkyls each of from one to four carbon atoms; $R_5$ is a member of the group consisting of hydroxy, hydroxy-lower-alkyl, lower-alkanoyloxy, benzoyloxy, $Y_3$-benzoyloxy, lower-alkanoyloxy-lower-alkyl, benzoyloxy-lower alkyl, ($Y_4$-benzoyloxy)-lower-alkyl, cycloalkyl-lower-alkyl of from five to seven ring carbon atoms, carbo-lower-alkoxy of from one to six carbon atoms in the lower-alkoxy moiety, unsubstituted-carbamyl, N-lower-alkylcarbamyl, N-lower-alkenylcarbamyl of from three to four carbon atoms in the lower-alkenyl moiety, N,N-di-lower-alkylcarbamyl, N,N-di-lower alkenylcarbamyl of from three to four carbon atoms in each lower-alkenyl moiety, aminocarbamyl, N-lower-alkylaminocarbamyl, N-lower-alkylidenehydrazono of from three to four carbon atoms in the lower-alkylidene moiety, N,N-di-lower-alkylaminomethyl, N,N-di-lower-alkenylaminomethyl of from three to four carbon atoms in each lower-alkenyl moiety, N,N-di-lower-alkylamino, and N,N-di-lower alkenylamino of from three to four carbon atoms in each lower-alkenyl moiety; Alk' is lower-alkylene of from one to six carbon atoms and interposing from one to five carbon atoms between the indolyl group and the carbonyl carbon atom of the lower-alkanoyl group; and $n$ is the integers 1 and 2; and wherein $Y_1$ is at least one member of the group consisting of halogen, lower-alkyl, hydroxy, lower-alkoxy, methylenedioxy, lower-alkylmercapto, lower-alkylsulfinyl, and lower-alkylsulfonyl; $Y_2$ is at least one member of the group consisting of halogen, lower-alkyl, hydroxy, lower-alkoxy, methylenedioxy, lower-alkylmercapto, lower-alkylsulfinyl, and lower-alkylsulfonyl; $Y_3$ is at least one member of the group consisting of halogen, lower-alkyl, hydroxy, lower-alkoxy, methylenedioxy, lower-alkylmercapto, lower-alkylsulfinyl, lower-alkylsulfonyl, amino, and lower-alkanoylamino; and $Y_4$ is at least one member of the group consisting of halogen, lower-alkyl, hydroxy, lower-alkoxy, methylenedioxy, lower-alkylmercapto, lower-alkylsulfinyl, lower-alkylsulfonyl, amino, and lower-alkanoylamino.

References Cited by the Examiner

UNITED STATES PATENTS

| | | | |
|---|---|---|---|
| 2,692,882 | 10/54 | Speeter | 260—319 |
| 2,708,197 | 5/55 | Speeter | 260—319 |
| 2,769,818 | 11/56 | Schlesinger | 260—294 |
| 2,857,390 | 10/58 | Kirchner | 260—294 |
| 3,000,885 | 9/61 | Cusic | 260—294 X |
| 3,007,933 | 11/61 | Hennion | 260—293 |
| 3,007,934 | 11/61 | Bencze | 260—294.7 X |
| 3,014,037 | 12/61 | Rorig | 260—294.7 |
| 3,036,081 | 5/62 | Nomine et al. | 260—294.7 |
| 3,072,530 | 1/63 | Hofmann et al. | 260—294.7 X |
| 3,075,976 | 1/63 | Jacob et al. | 260—294.7 X |
| 3,075,986 | 1/63 | Jacob et al. | 260—294.7 |

OTHER REFERENCES

James R. Vaughan, Jr.: "J. Am. Chem. Society," vol. 73, page 3547 (1957).

NICHOLAS S. RIZZO, *Primary Examiner.*

I. MARCUS, *Examiner.*

UNITED STATES PATENT OFFICE
CERTIFICATE OF CORRECTION

Patent No. 3,183,235   May 11, 1965

Bernard L. Zenitz

It is hereby certified that error appears in the above numbered patent requiring correction and that the said Letters Patent should read as corrected below.

In the heading to the printed specification, lines 2 and 3, title of invention, for "1-[3-, 2-, and 1-INDOLYL-LOWER-ALKANOYL]PIPERIDINES" read -- 1-[(3-, 2-, and 1-INDOLYL)-LOWER-ALKANOYL]PIPERIDINES --; column 2, line 9, for "aminoethyl" read -- aminomethyl --; line 30, for "[$CH_2CH_2CH_2(CH_3)CH_2$-]" read -- [-$CH_2CH_2CH(CH_3)CH_2$-] --; column 6, line 38, for "1-[1-indolyl)-" read -- 1-[(1-indolyl)- --; column 9, line 57, for "-glyoxally]-4-piperdone" read -- -glyoxalyl]-4-piperidone --; column 10, line 34, after "$CH_2CH_2$]" insert -- A solution of 4.48 g. (0.02 mole) of 2-(3-indolyl)ethyl --, as the beginning of a new paragraph; column 15, TABLE 3, second column, line 6, thereof for "2-(2-$ClC_6H_4COOCH_2CH_2$" read -- 2-(2-$ClC_6H_4COOCH_2CH_2$) --; column 26, line 11, for "-(2-hydroxethyl)-", in italics, read -- -(2-hydroxyethyl)- --, in italics; line 68, for "1-{3-4[-(5-" read -- 1-{3-[4-(5- --; column 28, line 42, for "cargon" read -- carbon --.

Signed and sealed this 16th day of November 1965.

(SEAL)
Attest:

ERNEST W. SWIDER
Attesting Officer

EDWARD J. BRENNER
Commissioner of Patents